United States Patent
Ahmed et al.

(10) Patent No.: US 11,729,551 B2
(45) Date of Patent: Aug. 15, 2023

(54) SYSTEMS AND METHODS FOR ULTRA-WIDEBAND APPLICATIONS

(71) Applicant: Meta Platforms Technologies, LLC, Menlo Park, CA (US)

(72) Inventors: Nabeel Ahmed, San Jose, CA (US); Sebastian Sztuk, Menlo Park, CA (US); Sam Padinjaremannil Alex, Dublin, CA (US); Kirk Erik Burgess, Newark, CA (US); Ankit Brahmbhatt, Pleasanton, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 17/565,772

(22) Filed: Dec. 30, 2021

(65) Prior Publication Data
US 2022/0303680 A1  Sep. 22, 2022

Related U.S. Application Data

(60) Provisional application No. 63/163,418, filed on Mar. 19, 2021.

(51) Int. Cl.
*H04R 3/12* (2006.01)
*H04W 76/14* (2018.01)
*H04W 4/02* (2018.01)

(52) U.S. Cl.
CPC ............. *H04R 3/12* (2013.01); *H04W 4/023* (2013.01); *H04W 76/14* (2018.02); *H04R 2420/07* (2013.01)

(58) Field of Classification Search
CPC .............................. H04R 3/12; H04R 2420/07
USPC ................................................ 381/77, 79-80
See application file for complete search history.

(56) References Cited

U.S. PATENT DOCUMENTS 10,064,038 B2 * 8/2018 Kulavik .................. H04W 4/80
10,721,571 B2 * 7/2020 Crow ..................... H04R 25/43
(Continued)

FOREIGN PATENT DOCUMENTS

EP  1560344 A1  8/2005
EP  2031418 A1  3/2009
(Continued)

OTHER PUBLICATIONS

Alanwar A., et al., "SeleCon: Scalable IoT Device Selection and Control Using Hand Gestures," IEEE/ACM Second International Conference on Internet-of-Things Design and Implementation (IoTDI), Apr. 18, 2017, pp. 47-58.

(Continued)

*Primary Examiner* — Disler Paul
(74) *Attorney, Agent, or Firm* — Foley & Lardner LLP

(57) ABSTRACT

In one aspect, the systems and methods described herein may include a first device comprising a first ultra-wideband (UWB) antenna. The first device may establish a connection with a second device having a second UWB antenna. The first device may determine an orientation of the first device relative to the second device, according to one or more UWB measurements between the first UWB antenna of the first device and the second UWB antenna of the second device. The first device may receive audio signals corresponding to the second device, and can render the audio signals into audio output to a user of the first device according to the determined orientation.

20 Claims, 10 Drawing Sheets

(56) References Cited

U.S. PATENT DOCUMENTS

| | | | |
|---|---|---|---|
| 11,470,444 B2* | 10/2022 | Burowski | H04W 4/026 |
| 11,516,337 B2* | 11/2022 | Ledvina | H04M 1/72457 |
| 2004/0028011 A1 | 2/2004 | Gehring et al. | |
| 2004/0156512 A1 | 8/2004 | Parker | |
| 2005/0041746 A1 | 2/2005 | Rosen et al. | |
| 2006/0171445 A1 | 8/2006 | Batra et al. | |
| 2007/0105501 A1 | 5/2007 | Shen et al. | |
| 2007/0201393 A1 | 8/2007 | Srikrishna et al. | |
| 2010/0272151 A1 | 10/2010 | Nandagopalan et al. | |
| 2010/0273505 A1 | 10/2010 | Moller et al. | |
| 2020/0068308 A1* | 2/2020 | Hosoi | H04R 1/02 |
| 2020/0382158 A1 | 12/2020 | Yang et al. | |
| 2021/0014677 A1 | 1/2021 | Han et al. | |
| 2021/0072373 A1* | 3/2021 | Schoenberg | G01S 13/765 |
| 2021/0160613 A1* | 5/2021 | Gigandet | G10L 21/0216 |
| 2021/0360366 A1 | 11/2021 | Bailey et al. | |
| 2022/0264251 A1* | 8/2022 | Wang | H04W 4/029 |

FOREIGN PATENT DOCUMENTS

| | | |
|---|---|---|
| WO | 2015144293 A2 | 10/2015 |
| WO | 2020214708 A1 | 10/2020 |
| WO | 2021023377 A1 | 2/2021 |

OTHER PUBLICATIONS

"IEEE Standard for Low-Rate Wireless Networks—Amendment 1: Enhanced Ultra Wideband (UWB) Physical Layers (PHYs) and Associated Ranging Techniques; IEEE Std 802.15.4z-2020 (Amendment to IEEE Std 802.15.4-2020)," IEEE Standard, Aug. 25, 2020 (Aug. 25, 2020), pp. 1-174, XP068170639, DOI: 10.1109/IEEESTD. 2020.9179124, Retrieved from the Internet: URL: https://ieeexplore.ieee.org/document/9179124, [retrieved an Aug. 31, 2020].

International Search Report and Written Opinion for International Application No. PCT/US2022/020233 dated Aug. 11, 2022, 19 pages.

International Search Report and Written Opinion for International Application No. PCT/US2022/020449 dated Jun. 21, 2022, 13 pages.

International Search Report and Written Opinion for International Application No. PCT/US2022/020563, dated Jul. 8, 2022, 12 pages.

International Search Report and Written Opinion for International Application No. PCT/US2022/020630, dated Aug. 10, 2022, 16 pages.

* cited by examiner

SYSTEMS AND METHODS FOR ULTRA-WIDEBAND APPLICATIONS

CROSS-REFERENCE TO RELATED APPLICATION

This application claims priority to and the benefit of U.S. Provisional Application No. 63/163,418, filed Mar. 19, 2021, entitled "SYSTEMS AND METHODS FOR ULTRA-WIDEBAND APPLICATIONS", which is incorporated herein by reference in its entirety for all purposes.

FIELD OF DISCLOSURE

The present disclosure is generally related to communications, including but not limited systems and methods for ultra-wideband applications.

BACKGROUND

Artificial reality such as virtual reality (VR), augmented reality (AR), or mixed reality (MR) provides immersive experience to a user. Typically, in systems and methods which implement or otherwise provide immersive experiences, such systems utilize Wi-Fi, Bluetooth, or Radio wireless links to transmit/receive data. However, using such wireless links typically requires detailed coordination between links, particularly where multiple devices in the same environment are utilizing the same wireless link technology for communications.

SUMMARY

In one aspect, this disclosure is directed to a method. The method may include establishing, by a first device comprising a first ultra-wideband (UWB) antenna, a connection with a second device having a second UWB antenna. The first device may determine an orientation of the first device relative to the second device, according to one or more UWB measurements between the first UWB antenna of the first device and the second UWB antenna of the second device. The first device may receive audio signals corresponding to the second device, and may render the audio signals into audio output to a user of the first device according to the determined orientation.

In some embodiments, the audio signals are received by the first device from the second device, and wherein the audio signals are generated by a microphone of the second device. In certain implementations, the audio signals are received by the first device from an audio source separate from the second device, and wherein the audio signals correspond to an object located in proximity to the second device. In one example, the first device or the second device comprises a plurality of UWB antennas, and wherein determining the orientation comprises determining an angle of arrival (AoA) of the first device relative to the second device. In some embodiments, the method includes displaying, by the first device, a user interface including representations of a plurality of second users, each of the plurality of second users corresponding to a respective audio source. Rendering the audio may comprise rendering the audio signals as audio output to the user of the first device according to the determined orientation, the audio signals comprising audio data from at least some of the respective audio sources. In some embodiments, rendering the audio signals comprises rendering, by the first device, the audio signals to the user of the first device according to the determined orientation with respect to representations of the plurality of second users on the user interface.

In some embodiments, the method includes selecting, by the first device, one of the respective audio sources for incorporating audio data into the audio signals rendered by the first device, according to the determined orientation. In one implementation, the first device receives a plurality of audio data streams from a plurality of microphones of the first device, and may select a first audio data stream of the plurality of audio data streams, according to the determined orientation of the first device relative to the second device, wherein the audio signals are from the first audio data stream. In some embodiments, the first device determines a change in the orientation of the first device relative to the second device, according to one or more second UWB measurements between the first UWB antenna of the first device and the second UWB antenna of the second device. The first device may select a second audio stream of the plurality of audio data streams, according to the determined change in the orientation of the first device relative to the second device. The first device may receive a request to pair with the second device. The first device may initiate pairing between the first device and the second device, and may receive the plurality of audio data streams from the plurality of microphones of the first device responsive to successful pairing between the first device and the second device.

In another aspect, this disclosure is directed to a device. The device may include a first ultra-wideband (UWB) antenna, and one or more processors. The one or more processors may be configured to establish a connection with a second device having a second UWB antenna. The one or more processors may be configured to determine an orientation of the first device relative to the second device, according to one or more UWB measurements between the first UWB antenna of the first device and the second UWB antenna of the second device. The one or more processors may be configured to receive audio signals corresponding to the second device. The one or more processors may be configured to render the audio signals into audio output to a user of the first device according to the determined orientation.

In another aspect, this disclosure is directed to a non-transitory computer readable medium storing instructions. The instructions may, when executed by one or more processors, cause one or more processors to establish a connection with a second device having a second UWB antenna. The one or more processors may be caused to determine an orientation of the first device relative to the second device, according to one or more UWB measurements between the first UWB antenna of the first device and the second UWB antenna of the second device. The one or more processors may be caused to receive audio signals corresponding to the second device. The one or more processors may be caused to render the audio signals into audio output to a user of the first device according to the determined orientation.

BRIEF DESCRIPTION OF THE DRAWINGS

The accompanying drawings are not intended to be drawn to scale. Like reference numbers and designations in the various drawings indicate like elements. For purposes of clarity, not every component can be labeled in every drawing.

DETAILED DESCRIPTION

Figure 1:
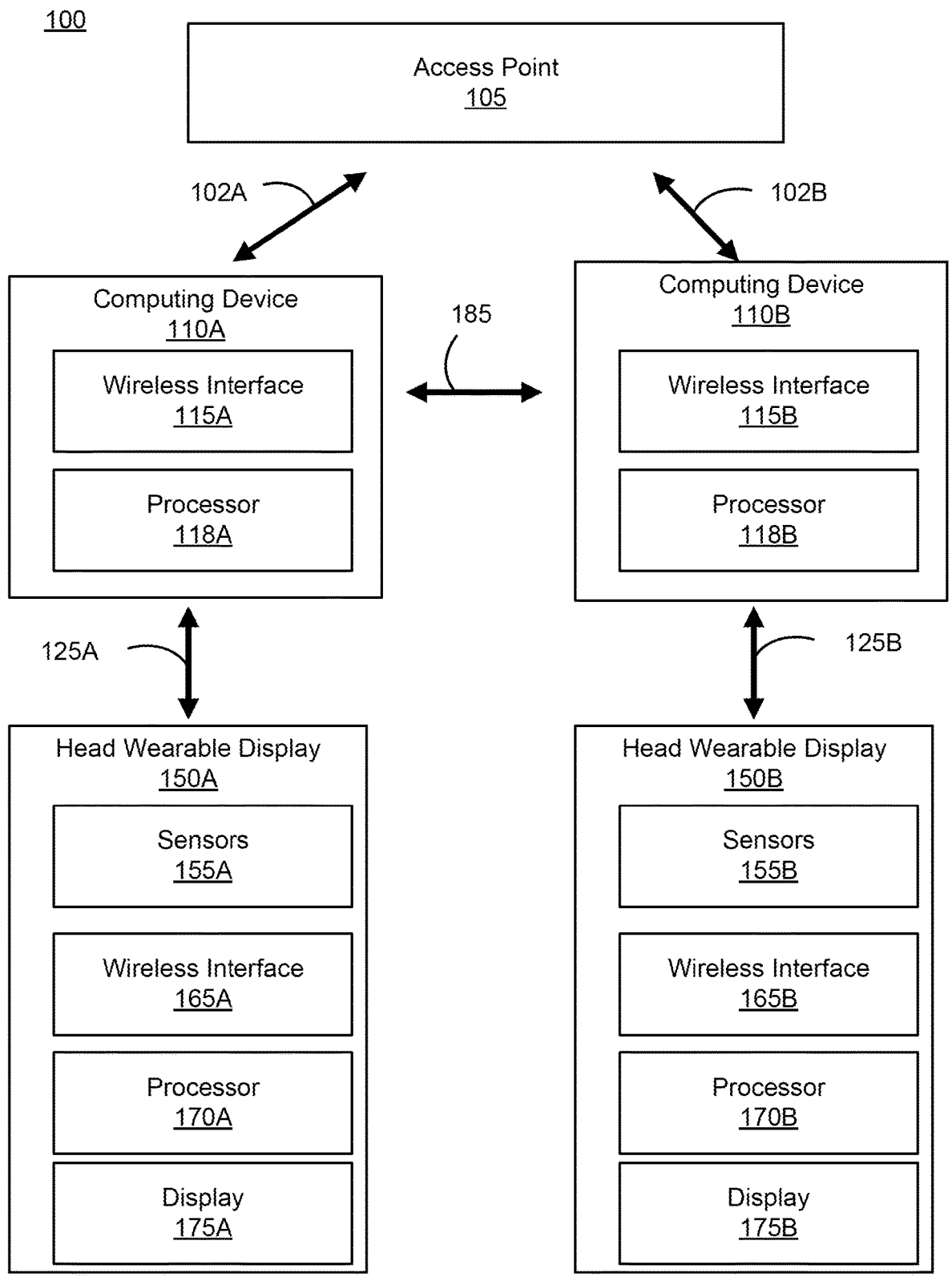
FIG. 1 is a diagram of a system environment including an artificial reality system, according to an example implementation of the present disclosure.

Before turning to the figures, which illustrate certain embodiments in detail, it should be understood that the present disclosure is not limited to the details or methodology set forth in the description or illustrated in the figures. It should also be understood that the terminology used herein is for the purpose of description only and should not be regarded as limiting.

Disclosed herein are embodiments related to devices operating in the ultra-wideband (UWB) spectrum. In various embodiments, UWB devices (including pucks, anchors, UWB beacons, UWB antennas, etc.) operate in the 3-10 GHz unlicensed spectrum using 500+ MHz channels which may require low power for transmission. For example, the transmit power spectral density (PSD) for some devices may be limited to −41.3 dBm/MHz. On the other hand, UWB may have transmit PSD values in the range of −5 to +5 dBm/MHz range, averaged over 1 ms, with a peak power limit of 0 dBm in a given 50 MHz band. Using simple modulation and spread spectrum, UWB devices may achieve reasonable resistance to Wi-Fi and Bluetooth interference (as well as resistance to interference with other UWB devices within a shared or common environment) for very low data rates (e.g., 10s to 100s Kbps) and may have large processing gains. However, for higher data rates (e.g., several Mbps), the processing gains may not be sufficient to overcome co-channel interference from Wi-Fi or Bluetooth. According to the embodiments described herein, the systems and methods described herein may operate in frequency bands that do not overlap with Wi-Fi and Bluetooth, but may have good global availability based on regulatory requirements. Since regulatory requirements make the 7-8 GHz spectrum the most widely available globally (and Wi-Fi is not present in this spectrum), the 7-8 GHz spectrum may operate satisfactory both based on co-channel interference and processing gains.

Some implementations of UWB may focus on precision ranging, security, and low to moderate rate data communication. For example, employing UWB devices as described herein allows for a determination of a relative location between two or more UWB devices with precision (e.g., determination of devices within 5-10 degrees of rotation and a distance within 0.5 mm). The determination of the location, position, tilt, and/or rotation of UWB devices relative to one another enables, among other features, clear spatial audio content to be communicated between the UWB devices (and/or between multiple other devices such as a first device and any peripheral devices). Spatial audio, in some aspects, refers to three-dimensional audio, where three-dimensional audio describes the phenomenon/situation of audio emanating from (or appearing to emanate from) various locations. In some embodiments, the audio signal may seem to originate within objects. In contrast to spatial content, head-locked content refers to content that is fixed with respect to a user. For example, a user wearing a head wearable device (HWD) configured with spatial audio capabilities may experience audio behind the user, in front of the user, above the user, to the side of the user, below the user, and so on. In contrast, a user wearing a HWD configured with head-locked rotation may experience a fixed audio sound emanating from a fixed location, regardless of the user's rotation/movement in an environment.

In some embodiments, sensors (e.g., inertial measurement units, magnetometers, cameras, etc.) can provide head locked rotation data corresponding to the movement and/or orientation of the sensors or an associated object. However, such collected sensor data may be affected by signal drift. Moreover, the collected sensor data may be limited in its ability to provide/maintain accurate positions in space. Additionally, the collected sensor data may be limited in its capacity to describe the distance of objects relative to position and rotations relative to other objects. In some embodiments, sensor data may be used in conjunction with such techniques as virtual reality simultaneous localization and mapping (VR SLAM) and object detection to enable spatial audio content to be communicated. However, utilizing a sensor such as a camera to facilitate spatial audio content implies that the camera would always be on, consuming excessive power and utilizing real estate on a limited space device (e.g., a head wearable device).

As UWB employs relatively simple modulation, it may be implemented at low cost and low power consumption. Accordingly, UWB devices may be employed to track movement and/or orientation so as to support, process and/or communicate spatial audio content. In AR/VR applications, link budget calculations for an AR/VR controller link indicate that the systems and methods described herein may be configured for effective data throughput ranging from ~2 to 31 Mbps (e.g., with 31 Mbps being the maximum possible rate in the latest 802.15.4z standard), which may depend on body loss assumptions. Using conservative body loss assumptions, the systems and methods described herein should be configured for data throughput of up to approximately 5 Mbps, which may be sufficient to meet the data throughput performance standards for AR/VR links. With a customized implementation, data throughput rate could be increased beyond 27 Mbps (e.g., to 54 Mbps), but with a possible loss in link margin.

Using UWB allows one or more devices to determine their relative distance to one another. The determination of a relative distance from a device can be used to anchor a user in a digital/physical/audio environment. Accordingly, spatial audio content can be output from a known source location (e.g., an audio source) and be received by a user coupled to a device based on the position/orientation of the user coupled to the device and the audio source. In some embodiments, sensors (such as IMUs and magnetometers) may collect data in conjunction with data collected from UWB devices to achieve a high sample rate relative to the determined location and/or rotation. Various applications, use cases, and further implementations of the systems and methods described herein are described in greater detail below.

FIG. 1 is a block diagram of an example artificial reality system environment 100. In some embodiments, the artificial reality system environment 100 includes an access point (AP) 105, one or more HWDs 150 (e.g., HWD 150A, 150B), and one or more computing devices 110 (computing devices 110A, 110B; sometimes referred to as devices or consoles) providing data for artificial reality to the one or more HWDs 150. The access point 105 may be a router or any network device allowing one or more computing devices 110 and/or one or more HWDs 150 to access a network (e.g., the Internet). The access point 105 may be replaced by any communication device (cell site). A computing device 110 may be a custom device or a mobile device that can retrieve content from the access point 105, and provide image data of artificial reality to a corresponding HWD 150. Each HWD 150 may present the image of the artificial reality to a user according to the image data. In some embodiments, the artificial reality system environment 100 includes more, fewer, or different components than shown in FIG. 1. In some embodiments, the computing devices 110A, 110B communicate with the access point 105 through wireless links 102A, 102B (e.g., interlinks), respectively. In some embodiments, the computing device 110A communicates with the HWD 150A through a wireless link 125A (e.g., intralink), and the computing device 110B communicates with the HWD 150B through a wireless link 125B (e.g., intralink). In some embodiments, functionality of one or more components of the artificial reality system environment 100 can be distributed among the components in a different manner than is described here. For example, some of the functionality of the computing device 110 may be performed by the HWD 150. For example, some of the functionality of the HWD 150 may be performed by the computing device 110.

In some embodiments, the HWD 150 is an electronic component that can be worn by a user and can present or provide an artificial reality experience to the user. The HWD 150 may be referred to as, include, or be part of a head mounted display (HMD), head mounted device (HMD), head wearable device (HWD), head worn display (HWD) or head worn device (HWD). The HWD 150 may render one or more images, video, audio, or some combination thereof to provide the artificial reality experience to the user. In some embodiments, audio is presented via an external device (e.g., speakers and/or headphones) that receives audio information from the HWD 150, the computing device 110, or both, and presents audio based on the audio information. In some embodiments, the HWD 150 includes sensors 155, a wireless interface 165, a processor 170, and a display 175. These components may operate together to detect a location of the HWD 150 and a gaze direction of the user wearing the HWD 150, and render an image of a view within the artificial reality corresponding to the detected location and/or orientation of the HWD 150. In other embodiments, the HWD 150 includes more, fewer, or different components than shown in FIG. 1.

In some embodiments, the sensors 155 include electronic components or a combination of electronic components and software components that detects a location and an orientation of the HWD 150. Examples of the sensors 155 can include: one or more imaging sensors, one or more accelerometers, one or more gyroscopes, one or more magnetometers, or another suitable type of sensor that detects motion and/or location. For example, one or more accelerometers can measure translational movement (e.g., forward/back, up/down, left/right) and one or more gyroscopes can measure rotational movement (e.g., pitch, yaw, roll). In some embodiments, the sensors 155 detect the translational movement and the rotational movement, and determine an orientation and location of the HWD 150. In one aspect, the sensors 155 can detect the translational movement and the rotational movement with respect to a previous orientation and location of the HWD 150, and determine a new orientation and/or location of the HWD 150 by accumulating or integrating the detected translational movement and/or the rotational movement. Assuming for an example that the HWD 150 is oriented in a direction 25 degrees from a reference direction, in response to detecting that the HWD 150 has rotated 20 degrees, the sensors 155 may determine that the HWD 150 now faces or is oriented in a direction 45 degrees from the reference direction. Assuming for another example that the HWD 150 was located two feet away from a reference point in a first direction, in response to detecting that the HWD 150 has moved three feet in a second direction, the sensors 155 may determine that the HWD 150 is now located at a vector multiplication of the two feet in the first direction and the three feet in the second direction.

In some embodiments, the wireless interface 165 includes an electronic component or a combination of an electronic component and a software component that communicates with the computing device 110. In some embodiments, the wireless interface 165 includes or is embodied as a transceiver for transmitting and receiving data through a wireless medium. The wireless interface 165 may communicate with a wireless interface 115 of a corresponding computing device 110 through a wireless link 125 (e.g., intralink). The wireless interface 165 may also communicate with the access point 105 through a wireless link (e.g., interlink). Examples of the wireless link 125 include a near field communication link, Wi-Fi direct, Bluetooth, or any wireless communication link. In some embodiments, the wireless link 125 may include one or more ultra-wideband communication links, as described in greater detail below. Through the wireless link 125, the wireless interface 165 may transmit to the computing device 110 data indicating the determined location and/or orientation of the HWD 150, the determined gaze direction of the user, and/or hand tracking measurement. Moreover, through the wireless link 125, the wireless interface 165 may receive from the computing device 110 image data indicating or corresponding to an image to be rendered.

In some embodiments, the processor 170 includes an electronic component or a combination of an electronic component and a software component that generates one or more images for display, for example, according to a change in view of the space of the artificial reality. In some embodiments, the processor 170 is implemented as one or more graphical processing units (GPUs), one or more central processing unit (CPUs), or a combination of them that can execute instructions to perform various functions described herein. The processor 170 may receive, through the wireless interface 165, image data describing an image of artificial reality to be rendered, and render the image through the display 175. In some embodiments, the image data from the computing device 110 may be encoded, and the processor 170 may decode the image data to render the image. In some embodiments, the processor 170 receives, from the computing device 110 through the wireless interface 165, object information indicating virtual objects in the artificial reality space and depth information indicating depth (or distances from the HWD 150) of the virtual objects. In one aspect, according to the image of the artificial reality, object information, depth information from the computing device 110, and/or updated sensor measurements from the sensors 155, the processor 170 may perform shading, reprojection, and/or blending to update the image of the artificial reality to correspond to the updated location and/or orientation of the HWD 150.

In some embodiments, the display 175 is an electronic component that displays an image. The display 175 may, for example, be a liquid crystal display or an organic light emitting diode display. The display 175 may be a transparent display that allows the user to see through. In some embodiments, when the HWD 150 is worn by a user, the display 175 is located proximate (e.g., less than 3 inches) to the user's eyes. In one aspect, the display 175 emits or projects light towards the user's eyes according to image generated by the processor 170. The HWD 150 may include a lens that allows the user to see the display 175 in a close proximity.

In some embodiments, the processor 170 performs compensation to compensate for any distortions or aberrations. In one aspect, the lens introduces optical aberrations such as a chromatic aberration, a pin-cushion distortion, barrel distortion, etc. The processor 170 may determine a compensation (e.g., predistortion) to apply to the image to be rendered to compensate for the distortions caused by the lens, and apply the determined compensation to the image from the processor 170. The processor 170 may provide the predistorted image to the display 175.

In some embodiments, the computing device 110 is an electronic component or a combination of an electronic component and a software component that provides content to be rendered to the HWD 150. The computing device 110 may be embodied as a mobile device (e.g., smart phone, tablet PC, laptop, etc.). The computing device 110 may operate as a soft access point. In one aspect, the computing device 110 includes a wireless interface 115 and a processor 118. These components may operate together to determine a view (e.g., a FOV of the user) of the artificial reality corresponding to the location of the HWD 150 and the gaze direction of the user of the HWD 150, and can generate image data indicating an image of the artificial reality corresponding to the determined view. The computing device 110 may also communicate with the access point 105, and may obtain AR/VR content from the access point 105, for example, through the wireless link 102 (e.g., interlink). The computing device 110 may receive sensor measurement indicating location and the gaze direction of the user of the HWD 150 and provide the image data to the HWD 150 for presentation of the artificial reality, for example, through the wireless link 125 (e.g., intralink). In other embodiments, the computing device 110 includes more, fewer, or different components than shown in FIG. 1.

In some embodiments, the wireless interface 115 is an electronic component or a combination of an electronic component and a software component that communicates with the HWD 150, the access point 105, other computing device 110, or any combination of them. In some embodiments, the wireless interface 115 includes or is embodied as a transceiver for transmitting and receiving data through a wireless medium. The wireless interface 115 may be a counterpart component to the wireless interface 165 to communicate with the HWD 150 through a wireless link 125 (e.g., intralink). The wireless interface 115 may also include a component to communicate with the access point 105 through a wireless link 102 (e.g., interlink). Examples of wireless link 102 include a cellular communication link, a near field communication link, Wi-Fi, Bluetooth, 60 GHz wireless link, ultra-wideband link, or any wireless communication link. The wireless interface 115 may also include a component to communicate with a different computing device 110 through a wireless link 185. Examples of the wireless link 185 include a near field communication link, Wi-Fi direct, Bluetooth, ultra-wideband link, or any wireless communication link. Through the wireless link 102 (e.g., interlink), the wireless interface 115 may obtain AR/VR content, or other content from the access point 105. Through the wireless link 125 (e.g., intralink), the wireless interface 115 may receive from the HWD 150 data indicating the determined location and/or orientation of the HWD 150, the determined gaze direction of the user, and/or the hand tracking measurement. Moreover, through the wireless link 125 (e.g., intralink), the wireless interface 115 may transmit to the HWD 150 image data describing an image to be rendered. Through the wireless link 185, the wireless interface 115 may receive or transmit information indicating the wireless link 125 (e.g., channel, timing) between the computing device 110 and the HWD 150. According to the information indicating the wireless link 125, computing devices 110 may coordinate or schedule operations to avoid interference or collisions.

The processor 118 can include or correspond to a component that generates content to be rendered according to the location and/or orientation of the HWD 150. In some embodiments, the processor 118 includes or is embodied as one or more central processing units, graphics processing units, image processors, or any processors for generating images of the artificial reality. In some embodiments, the processor 118 may incorporate the gaze direction of the user of the HWD 150 and a user interaction in the artificial reality to generate the content to be rendered. In one aspect, the processor 118 determines a view of the artificial reality according to the location and/or orientation of the HWD 150. For example, the processor 118 maps the location of the HWD 150 in a physical space to a location within an artificial reality space, and determines a view of the artificial reality space along a direction corresponding to the mapped orientation from the mapped location in the artificial reality space. The processor 118 may generate image data describing an image of the determined view of the artificial reality space, and transmit the image data to the HWD 150 through the wireless interface 115. The processor 118 may encode the image data describing the image, and can transmit the encoded data to the HWD 150. In some embodiments, the processor 118 generates and provides the image data to the HWD 150 periodically (e.g., every 11 ms or 16 ms).

In some embodiments, the processors 118, 170 may configure or cause the wireless interfaces 115, 165 to toggle, transition, cycle or switch between a sleep mode and a wake up mode. In the wake up mode, the processor 118 may enable the wireless interface 115 and the processor 170 may enable the wireless interface 165, such that the wireless interfaces 115, 165 may exchange data. In the sleep mode, the processor 118 may disable (e.g., implement low power operation in) the wireless interface 115 and the processor 170 may disable the wireless interface 165, such that the wireless interfaces 115, 165 may not consume power or may reduce power consumption. The processors 118, 170 may schedule the wireless interfaces 115, 165 to switch between the sleep mode and the wake up mode periodically every frame time (e.g., 11 ms or 16 ms). For example, the wireless interfaces 115, 165 may operate in the wake up mode for 2 ms of the frame time, and the wireless interfaces 115, 165 may operate in the sleep mode for the remainder (e.g., 9 ms) of the frame time. By disabling the wireless interfaces 115, 165 in the sleep mode, power consumption of the computing device 110 and the HWD 150 can be reduced.

Figure 2:
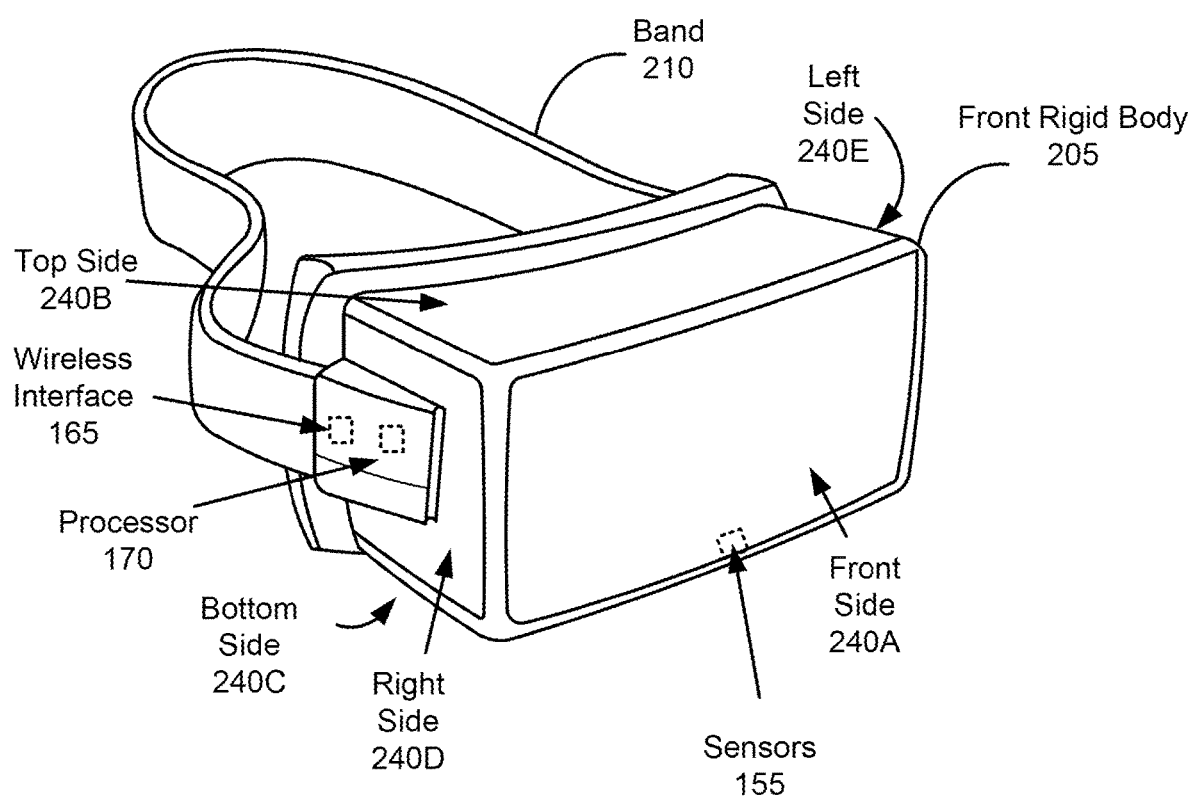
FIG. 2 is a diagram of a head wearable display, according to an example implementation of the present disclosure.

FIG. 2 is a diagram of a HWD 150, in accordance with an example embodiment. In some embodiments, the HWD 150 includes a front rigid body 205 and a band 210. The front rigid body 205 includes the electronic display 175 (not shown in FIG. 2), the lens (not shown in FIG. 2), the sensors 155, the eye trackers the communication interface 165, and the processor 170. In the embodiment shown by FIG. 2, the sensors 155 are located within the front rigid body 205, and may not be visible to the user. In other embodiments, the HWD 150 has a different configuration than shown in FIG. 2. For example, the processor 170, the eye trackers, and/or the sensors 155 may be in different locations than shown in FIG. 2.

Systems and Methods for Ultra-Wideband Devices

In various embodiments, the devices in the environments described above may operate or otherwise use components which leverage communications in the ultra-wideband (UWB) spectrum. In various embodiments, UWB devices operate in the 3-10 GHz unlicensed spectrum using 500+ MHz channels which may require low power for transmission. For example, the transmit power spectral density (PSD) for some systems may be limited to −41.3 dBm/MHz. On the other hand, UWB may have transmit PSD values in the range of −5 to +5 dBm/MHz range, averaged over 1 ms, with a peak power limit of 0 dBm in a given 50 MHz band. Using simple modulation and spread spectrum, UWB devices may achieve reasonable resistance to Wi-Fi and Bluetooth interference (as well as resistance to interference with other UWB devices located in the environment) for very low data rates (e.g., 10s to 100s Kbps) and may have large processing gains. However, for higher data rates (e.g., several Mbps), the processing gains may not be sufficient to overcome co-channel interference from Wi-Fi or Bluetooth. According to the embodiments described herein, the systems and methods described herein may operate in frequency bands that do not overlap with Wi-Fi and Bluetooth, but may have good global availability based on regulatory requirements. Since regulatory requirements make the 7-8 GHz spectrum the most widely available globally (and Wi-Fi is not present in this spectrum), the 7-8 GHz spectrum may operate satisfactory both based on co-channel interference and processing gains.

Figure 3:
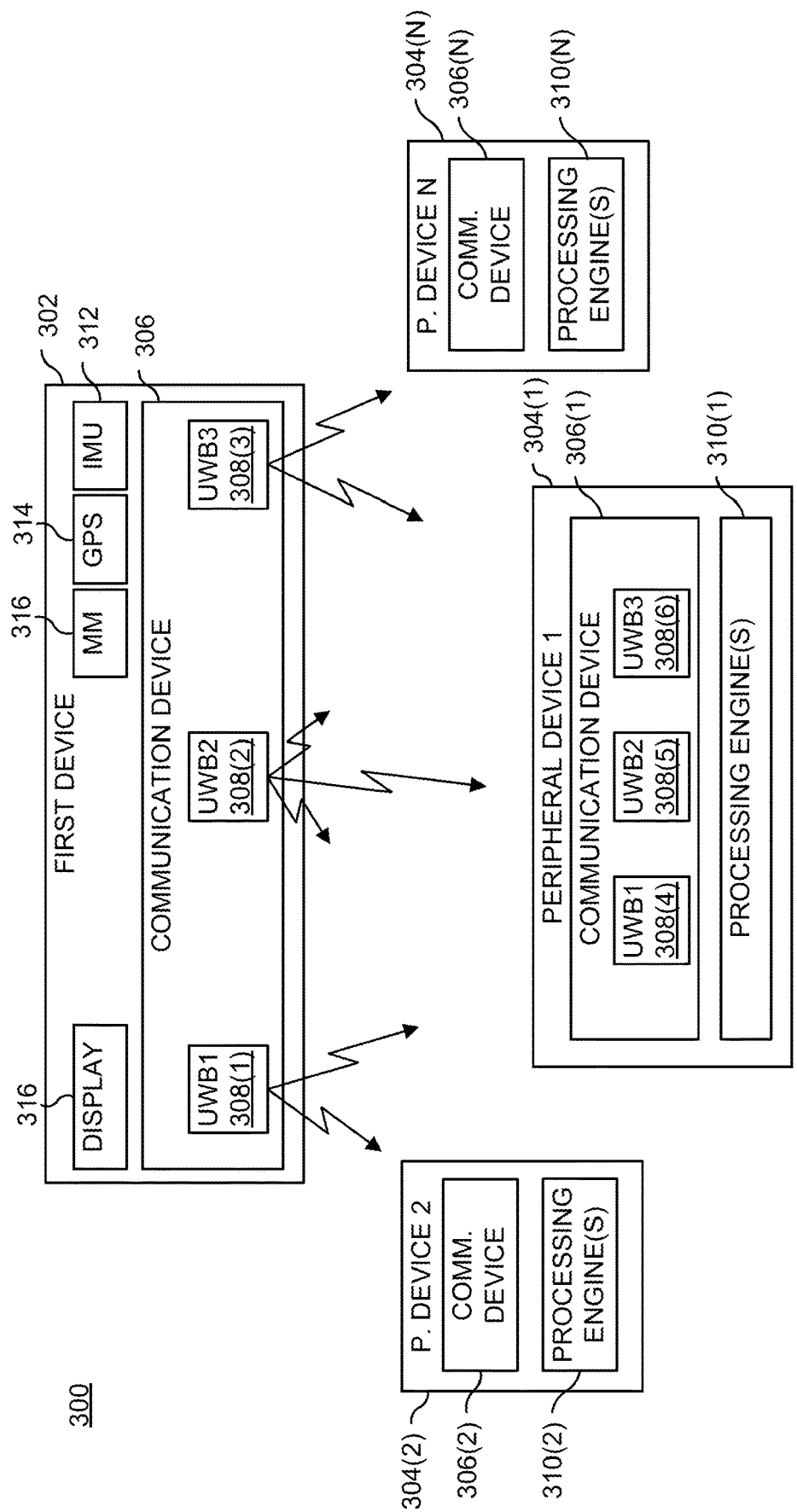
FIG. 3 is a block diagram of an artificial reality environment, according to an example implementation of the present disclosure.

Some implementations of UWB may focus on precision ranging, security, and for low-to-moderate rate data communication. As UWB employs relatively simple modulation, it may be implemented at low cost and low power consumption. In AR/VR applications (or in other applications and use cases), link budget calculations for an AR/VR controller link indicate that the systems and methods described herein may be configured for effective data throughput ranging from ~2 to 31 Mbps (e.g., with 31 Mbps being the maximum possible rate in the latest 802.15.4z standard), which may depend on body loss assumptions Referring now to FIG. 3, depicted is a block diagram of an artificial reality environment 300. The artificial reality environment 300 is shown to include a first device 302 and one or more peripheral devices 304(1)-304(N) (also referred to as "peripheral device 304" or "device 304"). The first device 302 and peripheral device(s) 304 may each include a communication device 306 including a plurality of UWB devices 308. A set of UWB devices 308 may be spatially positioned/located (e.g., spaced out) relative to each other on different locations on/in the first device 302 or the peripheral device 304, so as to maximize UWB coverage and/or to enhance/enable specific functionalities. The UWB devices 308 may be or include antennas, sensors, or other devices and components designed or implemented to transmit and receive data or signals in the UWB spectrum (e.g., between 3.1 GHz and 10.6 GHz) and/or using UWB communication protocol. In some embodiments, one or more of the devices 302, 304 may include various processing engines 310. The processing engines 310 may be or include any device, component, machine, or other combination of hardware and software designed or implemented to control the devices 302, 304 based on UWB signals transmitted and/or received by the respective UWB devices 308.

As noted above, the environment 300 may include a first device 302. The first device 302 may be or include a wearable device, such as the HWD 150 described above, a smart watch, AR glasses, or the like. In some embodiments, the first device 302 may include a mobile device (e.g., a smart phone, tablet, console device, or other computing device). The first device 302 may be communicably coupled with various other devices 304 located in the environment 300. For example, the first device 302 may be communicably coupled to one or more of the peripheral devices 304 located in the environment 300. The peripheral devices 304 may be or include the computing device 110 described above, a device similar to the first device 302 (e.g., a HWD 150, a smart watch, mobile device, etc.), an automobile or other vehicle, a beacon transmitting device located in the environment 300, a smart home device (e.g., a smart television, a digital assistant device, a smart speaker, etc.), a smart tag configured for positioning on various devices, etc. In some embodiments, the first device 302 may be associated with a first entity or user and the peripheral devices 304 may be associated with a second entity or user (e.g., a separate member of a household, or a person/entity unrelated to the first entity).

In some embodiments, the first device 302 may be communicably coupled with the peripheral device(s) 304 following a pairing or handshaking process. For example, the first device 302 may be configured to exchange handshake packet(s) with the peripheral device(s) 304, to pair (e.g., establish a specific or dedicated connection or link between) the first device 302 and the peripheral device 304. The handshake packet(s) may be exchanged via the UWB devices 308, or via another wireless link 125 (such as one or more of the wireless links 125 described above). Following pairing, the first device 302 and peripheral device(s) 304 may be configured to transmit, receive, or otherwise exchange UWB data or UWB signals using the respective UWB devices 308 on the first device 302 and/or peripheral device 304. In some embodiments, the first device 302 may be configured to establish a communications link with a peripheral device 304 (e.g., without any device pairing). For example, the first device 302 may be configured to detect, monitor, and/or identify peripheral devices 304 located in the environment using UWB signals received from the peripheral devices 304 within a certain distance of the first device 302, by identifying peripheral devices 304 which are connected to a shared Wi-Fi network (e.g., the same Wi-Fi network to which the first device 302 is connected), etc. In these and other embodiments, the first device 302 may be configured to transmit, send, receive, or otherwise exchange UWB data or signals with the peripheral device 304.

In some embodiments, the first device 302 may recognize one or more peripheral devices 304 and initiate a communication link. For example, the first device 302 may be preconfigured with peripheral devices 304 identified as reliable, safe, etc.

Figure 4:
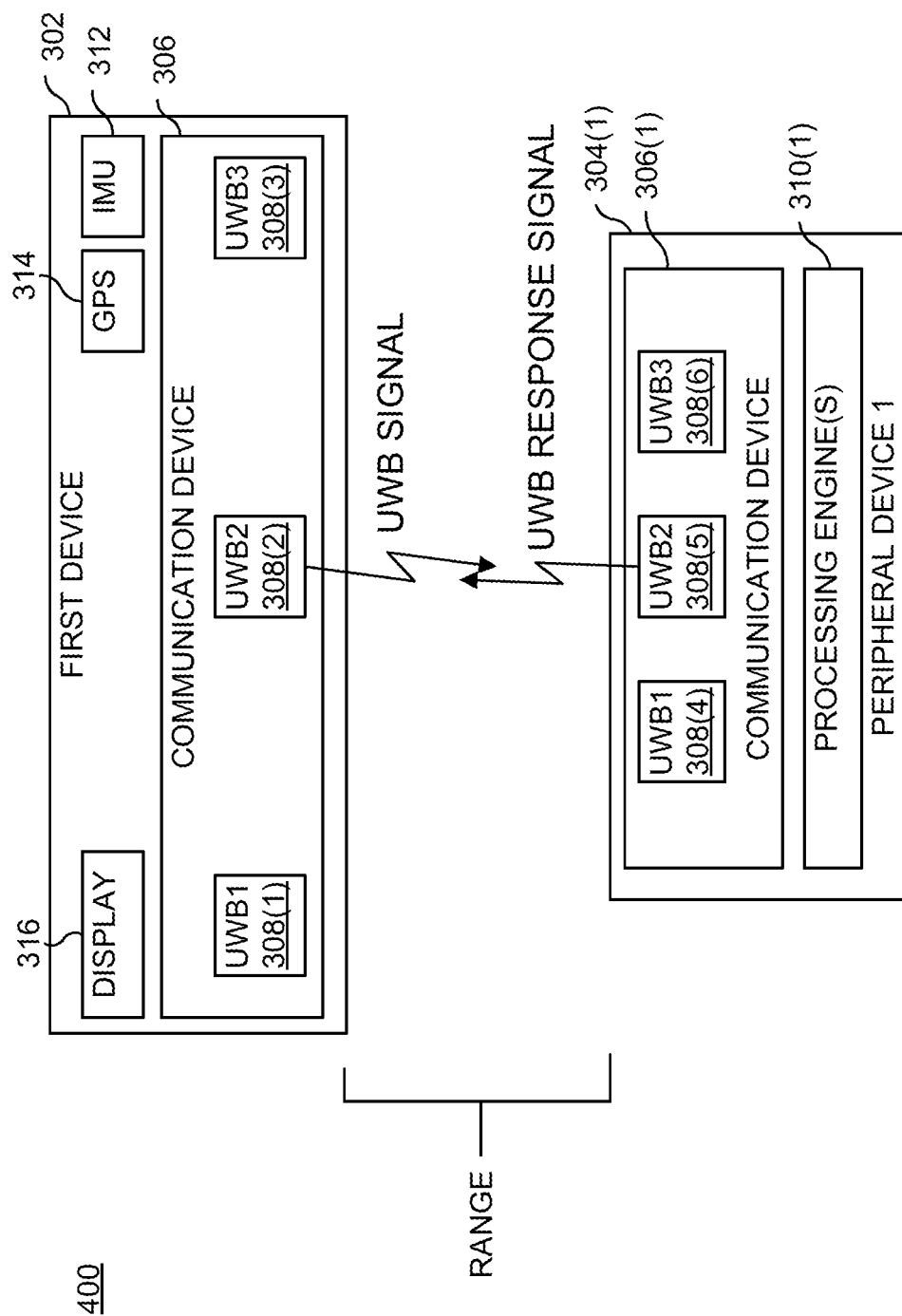
FIG. 4 is a block diagram of another artificial reality environment, according to an example implementation of the present disclosure.

Referring now to FIG. 4, depicted is a block diagram of an environment 400 including the first device 302 and a peripheral device 304. The first device 302 and/or the peripheral device 304 may be configured to determine a range (e.g., a spatial distance, separation) between the devices 302, 304. The first device 302 may be configured to send, broadcast, or otherwise transmit a UWB signal (e.g., a challenge signal). The first device 302 may transmit the UWB signal using one of the UWB devices 308 of the communication device 306 on the first device 302. The UWB device 308 may transmit the UWB signal in the UWB spectrum. The UWB signal may have a high bandwidth (e.g., 500 MHz). As such, the UWB device 308 may be configured to transmit the UWB signal in the UWB spectrum (e.g., between 3.1 GHz and 10.6 GHz) and having a high bandwidth (e.g., 500 MHz). The UWB signal from the first device 302 may be detectable by other devices within a certain range of the first device 302 (e.g., devices having a line of sight (LOS) within 200 m of the first device 302). As such, the UWB signal may be more accurate for detecting range between devices than other types of signals or ranging technology.

The peripheral device 304 may be configured to receive or otherwise detect the UWB signal from the first device 302. The peripheral device 304 may be configured to receive the UWB signal from the first device 302 via one of the UWB devices 308 on the peripheral device 304. The peripheral device 304 may be configured to broadcast, send, or otherwise transmit a UWB response signal responsive to detecting the UWB signal from the first device 302. The peripheral device 304 may be configured to transmit the UWB response signal using one of the UWB devices 308 of the communication device 306 on the peripheral device 304. The UWB response signal may be similar to the UWB signal sent from the first device 302.

The first device 302 may be configured to detect, compute, calculate, or otherwise determine a time of flight (TOF) based on the UWB signal and the UWB response signal. The TOF may be a time or duration between a time in which a signal (e.g., the UWB signal) is transmitted by the first device 302 and a time in which the signal is received by the peripheral device 304. The first device 302 and/or the peripheral device 304 may be configured to determine the TOF based on timestamps corresponding to the UWB signal. For example, the first device 302 and/or peripheral device 304 may be configured to exchange transmit and receive timestamps based on when the first device 302 transmits the UWB signal (a first TX timestamp), when the peripheral device receives the UWB signal (e.g., a first RX timestamp), when the peripheral device sends the UWB response signal (e.g., a second TX timestamp), and when the first device 302 receives the UWB response signal (e.g., a second RX timestamp). The first device 302 and/or the peripheral device 304 may be configured to determine the TOF based on a first time in which the first device 302 sent the UWB signal and a second time in which the first device 302 received the UWB response signal (e.g., from the peripheral device 304), as indicated by first and second TX and RX timestamps identified above. The first device 302 may be configured to determine or calculate the TOF between the first device 302 and the peripheral device 304 based on a difference between the first time and the second time (e.g., divided by two).

In some embodiments, the first device 302 may be configured to determine the range (or distance) between the first device 302 and the peripheral device 304 based on the TOF. For example, the first device 302 may be configured to compute the range or distance between the first device 302 and the peripheral device 304 by multiplying the TOF and the speed of light (e.g., TOF×c). In some embodiments, the peripheral device 304 (or another device in the environment 400) may be configured to compute the range or distance between the first device 302 and peripheral device 304. For example, the first device 302 may be configured to transmit, send, or otherwise provide the TOF to the peripheral device 304 (or other device), and the peripheral device 304 (or other device) may be configured to compute the range between the first device 302 and peripheral device 304 based on the TOF, as described above.

Figure 5:
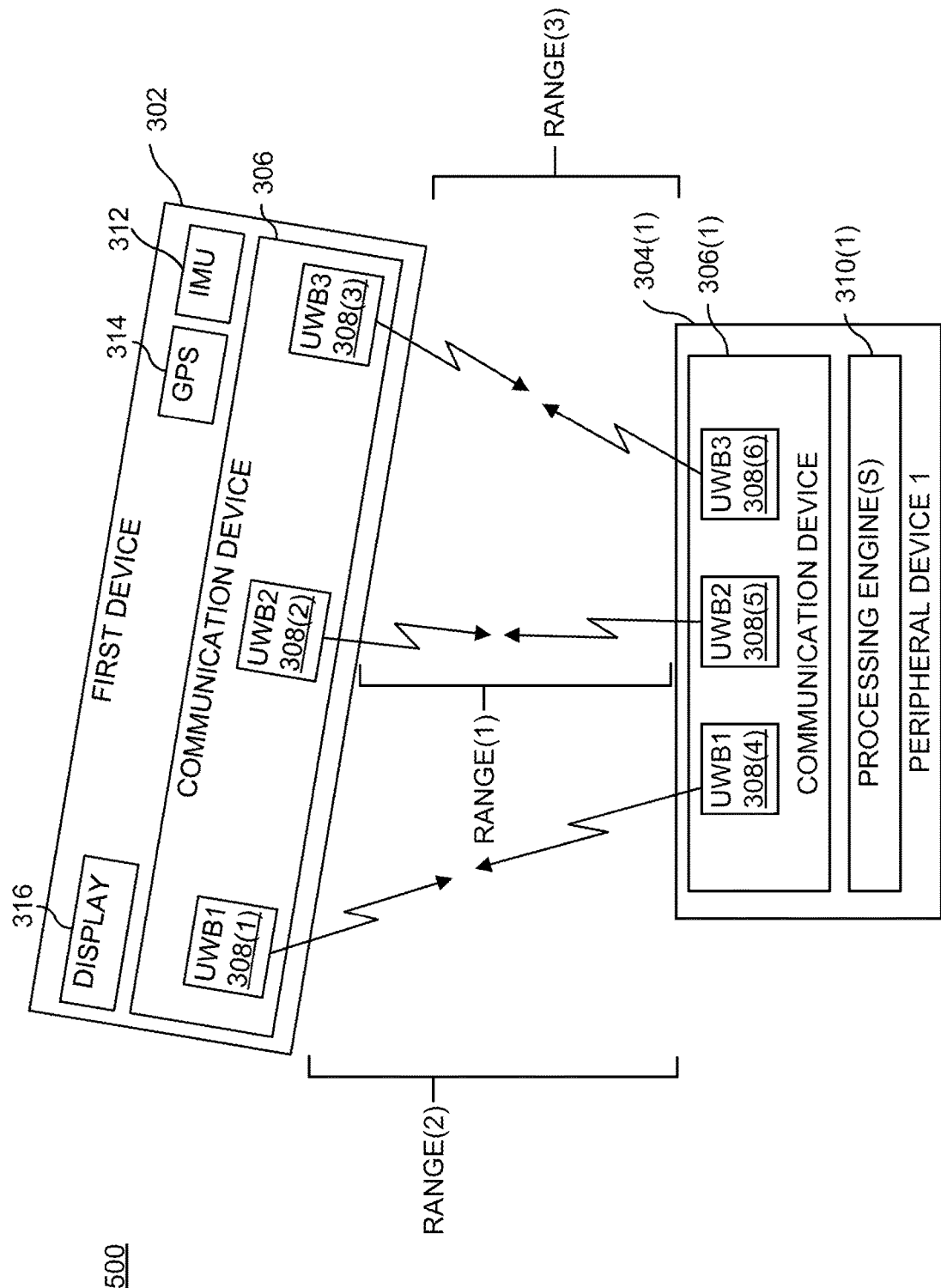
FIG. 5 is a block diagram of another artificial reality environment, according to an example implementation of the present disclosure.

Referring now to FIG. 5, depicted is a block diagram of an environment 500 including the first device 302 and a peripheral device 304. In some embodiments, the first device 302 and/or the peripheral device 304 may be configured to determine a position or pose (e.g., orientation) of the first device 302 relative to the peripheral device 304. The first device 302 and/or the peripheral device 304 may be configured to determine the relative position or orientation in a manner similar to determining the range as described above. For example, the first device 302 and/or the peripheral device 304 may be configured to determine a plurality of ranges (e.g., range(1), range(2), and range(3)) between the respective UWB devices 308 of the first device 302 and the peripheral device 304. In the environment 500 of FIG. 5, the first device 302 is positioned or oriented at an angle relative to the peripheral device 304. The first device 302 may be configured to compute the first range (range(1)) between central UWB devices 308(2), 308(5) of the first and peripheral device 304. The first range may be an absolute range or distance between the devices 302, 304, and may be computed as described above with respect to FIG. 4.

The first device 302 and/or the peripheral device 304 may be configured to compute the second range(2) and third range(3) similar to computing the range(1). In some embodiments, the first device 302 and/or the peripheral device 304 may be configured to determine additional ranges, such as a range between UWB device 308(1) of the first device 302 and UWB device 308(5) of the peripheral device 304, a range between UWB device 308(2) of the first device 302 and UWB device 308(6) of the peripheral device 304, and so forth. While described above as determining a range based on additional UWB signals, it is noted that, in some embodiments, the first device 302 and/or the peripheral device 304 may be configured to determine a phase difference between a UWB signal received at a first UWB device 308 and a second UWB device 308 (i.e., the same UWB signal received at separate UWB devices 308 on the same device 302, 304). The first device 302 and/or the peripheral device 304 may be configured to use each or a subset of the computed ranges (or phase differences) to determine the pose, position, orientation, etc. of the first device 302 relative to the peripheral device 304. Determining the pose, position, orientation, etc. of the first device 302 relative to the peripheral device 304 based on phase differences between UWB signals at the first device 302 and peripheral device 304 may be considered determining the post, position, orientation, etc. according to an angles of arrival (AoA). For example, the first device and/or the peripheral device 304 may be configured to use one of the ranges relative to the first range(1) (or phase differences) to determine a yaw of the first device 302 relative to the peripheral device 304, another one of the ranges relative to the first range(1) (or phase differences) to determine a pitch of the first device 302 relative to the peripheral device 304, another one of the ranges relative to the first range(1) (or phase differences) to determine a roll of the first device 302 relative to the peripheral device 304, and so forth.

By using the UWB devices 308 at the first device 302 and peripheral devices 304, the range and pose may be determined with greater accuracy than other ranging/wireless link technologies. For example, the range may be determined within a granularity or range of +/−0.1 meters, and the pose/orientation may be determined within a granularity or range of +/−5 degrees.

Referring to FIG. 3-FIG. 5, in some embodiments, the first device 302 may include various sensors and/or sensing systems. For example, the first device 302 may include an inertial measurement unit (IMU) sensor 312, global positioning system (GPS) 314, magnetometer (MM) 316, etc. The sensors and/or sensing systems, such as the IMU sensor 312, MM 316, and/or GPS 314 may be configured to generate data corresponding to the first device 302. For example, the IMU sensor 312 may be configured to generate data corresponding to an absolute position and/or pose of the first device 302. Similarly, the GPS 314 may be configured to generate data corresponding to an absolute location/position of the first device 302. Further, the MM 316 may be configured to measure magnetic fields and/or magnetic dipoles. The data from the IMU sensor 312, MM 316 and/or GPS 314 may be used in conjunction with the ranging/position data determined via the UWB devices 308 as described above. For example, collecting IMU 312 data and MM 316 data, in addition to UWB data, may allow the first device 302 to achieve a high sample rate relative to the first device 302 location and/or rotation.

In some embodiments, the first device 302 may include a display 316. The display 316 may be integrated or otherwise incorporated in the first device 302. In some embodiments, the display 316 may be separate or remote from the first device 302. The display 316 may be configured to display, render, or otherwise provide visual information to a user or wearer of the first device 302, which may be rendered at least in part on the ranging/position data of the first device 302.

One or more of the devices 302, 304 may include various processing engine(s) 310. As noted above, the processing engine(s) 310 may be or include any device, component, machine, or combination of hardware and software designed or implemented to control the devices 302, 304 based on UWB signals transmitted and/or received by the respective UWB devices 308. In some embodiments, the processing engine(s) 310 may be configured to compute or otherwise determine the ranges/positions of the first device 302 relative to the peripheral devices 304 as described above. In some embodiments, the processing engines 310 may be located or embodied on another device in the environment 300-500 (such as at the access point 105 as described above with respect to FIG. 1). As such, the first device 302 and/or peripheral devices 304 may be configured to off-load computation to another device in the environment 300-500 (such as the access point 105). In a particular example, a user wearing HWD 150 may offload one or more computations (such as an orientation computation) to another device such as a watch and/or phone associated with the user (e.g., peripheral devices 304). The first device 302 and/or peripheral device 304 may also be configured to share information (e.g., cast images displayed on the first device 302 such that the images are displayed on the peripheral device 304). In some embodiments, the first device 302 and/or peripheral devices 304 may be configured to off-load computation to another device in another environment.

In some embodiments, the processing engines 310 may be configured to perform various functions and computations relating to radio transmissions and scheduling (e.g., via the UWB devices 308 and/or other communication interface components), compute or otherwise determine range and relative position of the devices 302, 304, manage data exchanged between the devices 302, 304, interface with external components (such as hardware components in the environment 300-500, external software or applications, etc.), and the like. In some embodiments, the processing engine 310 is configured to perform such various functions and computations responsive to verification/authorization. For example, the processing engines 310 may prompt the user coupled to the first device 302 to enter a user credential (username and password, answer to security question, passcode, biometric information, etc.) for verification by comparing the received user credential to one or more stored user credentials. For instance, authorized user credentials may be stored in a lookup table matching user authentication information (e.g., name, home address, IP address, MAC address, phone number, biometric data, passwords, usernames) to authenticated users. In response to the successful verification, the first device 302 may initiate the pairing/handshaking process with peripheral device(s) 304 such that the first device 302 does not pair to the peripheral device(s) 304 unless the user is authenticated. In some embodiments, the processing engine 310 may authenticate a user coupled to the first device 302 in response to the user coupled to the first device 302 being within a threshold proximity to one or more peripheral devices 304. The first device 302 and/or peripheral device(s) 304 may determine a proximity based on UWB measurements. In response to the first device 302 and/or peripheral device(s) 304 being within a predetermined proximity, the processing engine 310 may transmit a token (such as a device token) to the peripheral device(s). The token may identify the user to the peripheral device(s), confirming that the user is authorized. Additionally or alternatively, the first device 302 may receive (instead of transmit) a token from the peripheral device(s) and can compare the received token to a token stored in memory of the first device 302 to authorize the tokens received from the peripheral device(s). In some embodiments, the first device 302 may prompt the user for user credentials at a first time (e.g., upon the first device 302 being coupled to the user). The first device 302 may also prompt the user for user credentials at a second time (e.g., upon the first device 302 being within a threshold proximity to peripheral device(s), upon attempting to establish a communication link with the peripheral device(s), etc.). In this manner, the first device 302 may perform double verification of the user. Various examples of functions and computations which may be performed by the processing engine(s) 310 are described in greater detail below.

Figure 6:
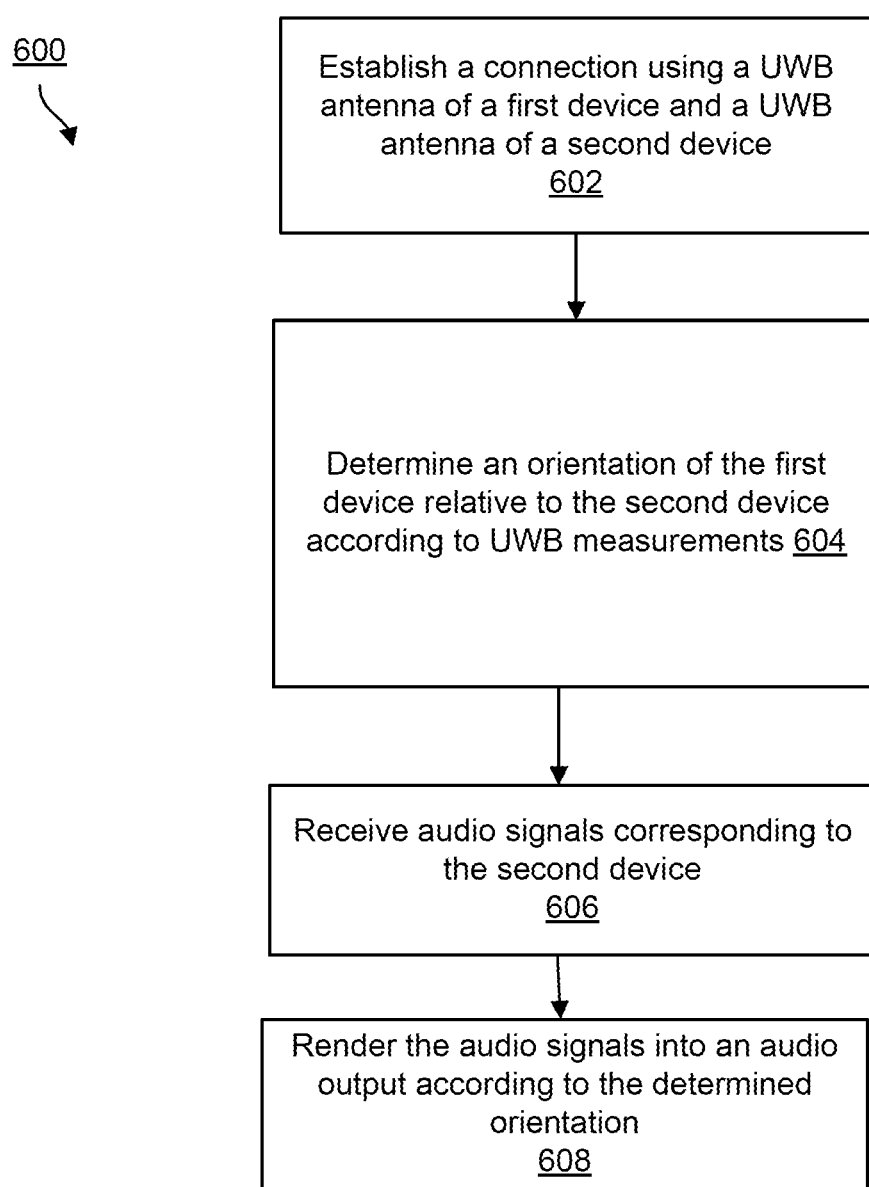
FIG. 6 is a flow chart directed to a process of rendering an audio signal according to an orientation of the first device relative to a peripheral device, according to an example implementation of the present disclosure.

Referring now to FIG. 6, depicted is a flow chart directed to a process 600 of rendering an audio signal according to an orientation of the first device relative to a peripheral device, according to example implementations of the present disclosure. In some embodiments, the process 600 is performed by the first device (e.g., HWD 150, first device 302), a peripheral device (e.g., peripheral device 304), and/or a third party device (e.g., access point 105). The first device is a device configured to render (or output) audio. Generally, the first device includes at least one UWB device (e.g., a UWB antenna), and a speakerphone (e.g. an audio output device). The first device may also include a microphone and a display. In some embodiments, the second device is the peripheral device 304 (e.g., a puck, a display, etc.), a HWD 150, and/or third party device. The second device may be a device configured to generate and/or communicate audio. Generally, the peripheral device includes at least one UWB device (e.g., UWB antenna) and a microphone. In some embodiments, the process 600 includes more, fewer, or different steps than shown in FIG. 6.

In a first operation 602, the first device may establish a connection with the second device. In some embodiments, the connection may be initiated according to a schedule. For example, the first device may wake up from a sleep state according to a schedule and can establish a connection with the second device. Additionally or alternatively, the first device may establish a connection with the second device in response to being within a threshold proximity to the second device. In some embodiments, the first device may establish the connection with the second device using a handshaking process. The first device and second device may be configured to establish a connection using a handshaking process for privacy and/or security purposes. For example, the first device may receive a request to pair with the second device. The first device may initiate a pairing operation between the first device and the second device. In some embodiments, the first device and second device perform beamforming responsive to the successful pairing between the first device and second device. In other embodiments, the first device establishes the connection with the second device without a handshaking process.

In operation 604, the first device determines an orientation of the first device relative to the second device according to one or more UWB measurements. In some embodiments, the orientation is determined according to one or more ranges of the first device and the second device. In other embodiments, the orientation is determined according to one or more TOF calculations of the first device and the second device. In yet other embodiments, the orientation is determined according to one or more AoA.

As described herein, the first device and/or the second device may be configured to determine the orientation based on one or more ranges (spatial distance, separation) between the first device and second device. The first device and/or second device may determine the ranges using a TOF determination. For example, the first device and/or second device may determine a TOF in response to analyzing a first TX timestamp associated with a transmitted UWB signal from a UWB antenna on the first device, a first RX timestamp associated with a received UWB signal at a UWB antenna at the second device, a second TX timestamp associated with a transmitted UWB signal from a UWB antenna on the second device, and a second RX timestamp associated with a received UWB signal at a UWB antenna at the first device. The first device and/or second device can determine a range using the TOF determination and the speed of light. The first device and/or second device may determine an orientation based on comparing multiple ranges associated with multiple UWB antennas on the first and second devices. For example, the first device is closest to the second device at a location corresponding to the shortest range. For example, referring to FIG. 5, the shortest range (e.g., range 3) between a pair of UWB antennas (e.g., UWB antenna 308(3) on the first device and UWB antenna 308(6) on the second device) indicates that the first device and second device are closest to each other at a location corresponding to the location of the UWB antennas. In contrast, the longest range (e.g., range 1) between a pair of UWB antennas (e.g., UWB antenna 308(1) on the first device and UWB antenna 308(4) on the second device) indicates that the first device and second device are farthest from each other at a location corresponding to the location of the UWB antennas. In some embodiments, increasing the number of UWB antennas on the first and second devices increases the granularity/accuracy of the orientation of the first device with respect to the second device.

Referring back to FIG. 6, the first device and/or second device may also determine an orientation using TOF information. For example, the longest/farthest TOF determination between a pair of UWB antennas may indicate that the devices are farthest from each other at the location corresponding to the UWB antennas. Moreover, the shortest/closest TOF determination between a pair of UWB antennas may indicate that the devices are closest to each other at the location corresponding to the UWB antennas.

The first device and/or the second device may also determine an orientation using AoAs. For example, the first device may determine an AoA in response to analyzing a first phase associated with a received UWB signal from a UWB antenna at a second device, at a UWB antenna on the first device, and a second phase associated with a received UWB signal from a UWB antenna at the second device, at a second UWB antenna at the first device.

In some embodiments, collected sensor data may supplement the orientation determined by the first device and/or second. For example, a confidence level associated with the orientation of the first device relative to the second device may increase in response to orientation information collected from an IMU sensor supporting the orientation of the first device and/or second device (e.g., a tilt of the device, rotation of the device, yaw of the device, etc.).

In operation 606, the first device receives an audio signal (including one or more audio data streams) from the second device. For example, the audio signal received from the second device may be generated by a microphone of the second device. The second device may transmit the full audio signal to the first device (e.g., the audio signal including all of the audio content). In some embodiments, the first device may transmit the orientation of the first device relative to the second device, to the second device. The second device may modify/process/adjust/re-orient the audio signal and transmit a modified audio signal (including modified data streams) based on the received orientation information. In other embodiments, the second device may determine the orientation of the first device relative to the second device and can manipulate/modify/re-orient the audio signal before transmitting the audio signal to the first device.

Accordingly, the second device may not transmit the full/original audio signal to the first device and only transmits the (e.g., filtered, modified and/or intensity-adjusted) audio signal (and associated data streams) relevant to the first device based on the orientation of the first device. For example, the second device may be configured to dampen one or more portions of the audio signal by reducing the amplitude of the one or more portions of the audio signal, filter out one or more frequencies, and the like. Similarly, the second device may be configured to boost one or more portions of the audio signal by increasing the amplitude of one or more portions of the audio signal. Moreover, the second device may be configured to reverberate one or more portions of the audio signal by copying and/or dampening (or boosting) the one or more portions of the audio signal. The second device may apply any one or more operations to the audio signal to modify/adjust/re-balance/orient the audio signal according to the determined orientation of the first device relative to the second device.

In some embodiments, the first device receives an audio signal from an audio source separate from the second device. For example, the audio signal may correspond to an object located in proximity to the second device. For instance, the audio signal may correspond to an object (e.g., a painting, an exhibit, etc.) in proximity to the second device.

In some embodiments, the first device receives an audio signal from one or more microphones of the first device. In these embodiments, the first device may select and/or amplify an audio data stream of the audio signal (e.g., while filtering away, dampening and/or reducing one or more other audio data streams) according to the orientation of the first device relative to the second device. Additionally or alternatively, the first device may modify the audio signal (e.g., dampen the audio signal, boost the audio signal, reverberate the audio signal, etc.) according to the determined orientation of the first device relative to the second device.

In operation 608, the first device renders the received audio signal to a user of the first device, in some embodiments. For example, the first device may use a speakerphone to play/render/output the audio. If the second device transmits the full/original audio signal to the first device, the first device may be configured to modify/adjust the audio signal based on the orientation of the first device relative to the second device, as described herein. Additionally or alternatively, the first device may select and/or amplify a data stream (e.g., from a plurality of data streams) of the audio signal based on the orientation of the first device relative to the second device. The first device may then render the modified/selected portion of the audio signal.

In some embodiments, before the first device renders the modified/selected portion of the audio signal, the first device may check/recalculate the orientation of the first device relative to the second device. For instance, the first device may determine whether the orientation has changed and/or whether there are any updates. The first device may determine any changes in the orientation of the first device relative to the second device based on additional UWB antenna measurements. For example, the first device may determine a change in orientation based on recalculating TOF measurements and/or range measurements. If the orientation has changed, the first device may modify one or more portions of the audio signal based on the updated orientation of the first device relative to the second device (e.g., dampen a portion of the audio signal, boost another portion of the audio signal, filter frequencies, add reverberation, etc.). Additionally or alternatively, the first device may select one or more audio streams of the audio signal to render based on the updated orientation.

Additionally or alternatively, the first device may receive a modified audio signal from the second device as a result of the second device modifying the audio signal based on the orientation of the first device relative to the second device. In some embodiments, the first device may further modify the already modified (received) audio signal from the second device. For example, the first device may update the orientation based on recalculating TOF measurements and/or range measurements, and can modify the audio signal according to the updated orientation. Additionally or alternatively, the first device may select one or more audio streams of the modified audio signal to render based on the updated orientation. Accordingly, the first device may modify the already modified audio signal in response to the updated orientation.

In a first non-limiting example, a digital (or virtual) concert (or other scenario) may exist in an environment. The concert may be spatialized such that a user walking around the environment and coupled to a HWD (e.g., wearing the HWD, holding the HWD) may experience (hear) shifted instruments in response to the user's position in the environment. In operation, one or more UWB antennas of the HWD may establish a connection with a second device. For example, the HWD may discover the second device using one or more discovery mechanisms and can pair to the second device. The HWD and the second device may determine an orientation with respect to one another (using TOF, ranges, and/or AoA). As the user walks around the environment, the orientation/direction of the HWD and the second device change, resulting in the shifted instruments (e.g., spatially shifted and/or audio-shifted instruments) in response to the user's position in the environment.

Figure 7B:
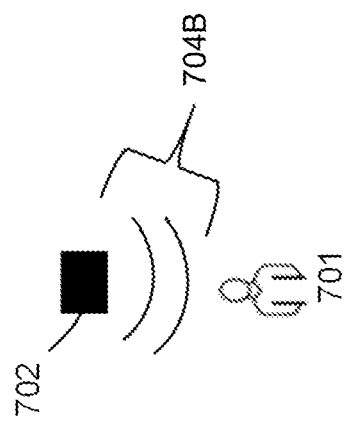
FIGS. 7A and 7B illustrate examples of world locked spatial audio in an environment, according to an example implementation of the present disclosure.
Figure 7A:
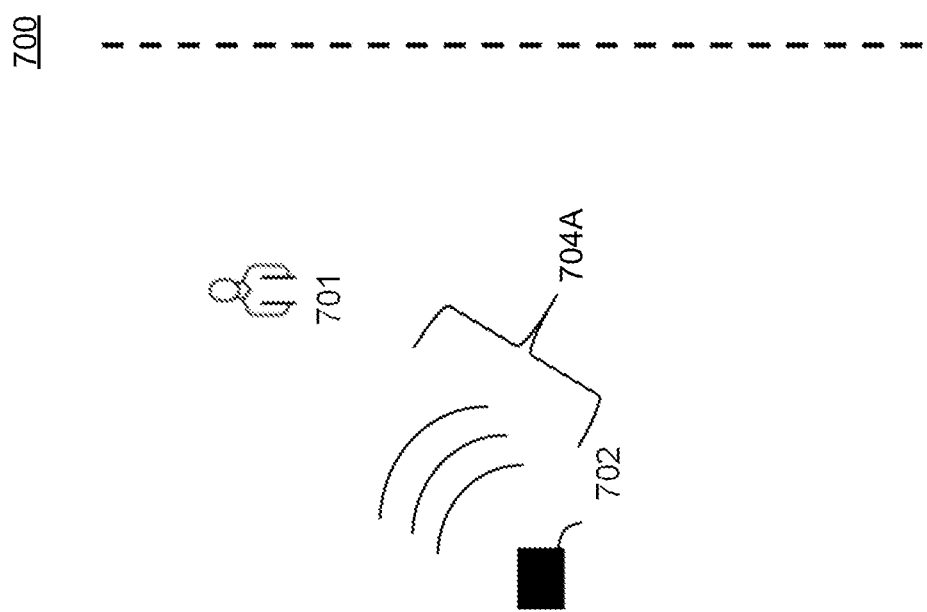

FIGS. 7A and 7B illustrate examples of world locked spatial audio in an environment, according to an example implementation of the present disclosure. As illustrated, a user walks around an environment and the orientation of a first device (coupled to the user) with respect to a second device (in the environment) can change accordingly. The environment may include multiple devices with UWB antennas, tags, beacons, or anchors placed in known locations, etc. For example, a device in an amusement park and/or museum may contain UWB devices. The UWB device(s) in the environment may be used in conjunction with the UWB device(s) in the first device to determine a proximity of the first device (and the user coupled to the first device) to the devices in the environment, the direction of the first device (and the user coupled to the first device) to the devices in the environment, and/or the orientation of the first device (and the user coupled to the first device) to the devices in the environment. In some embodiments, the first device may use triangulation of each of the UWB devices in the devices in the environment to determine a location, direction, orientation, altitude, and the like.

As shown in FIG. 7A, the orientation of a first device 701 coupled to a user (e.g., held by a user, worn by a user, etc.) and the second device 702 may be at a first position in environment 700. In response to the first device 701 being coupled to the user and second device 702 being in the first position, the second device 702 may transmit a signal 704A to the first device 701 coupled to the user. In contrast, in FIG. 7B, the orientation of the first device 701 coupled to the user and the second device 702 are in a second position in the environment 700. In response to the first device 701 coupled to the user and second device 702 being in the second position, the second device 702 transmits a signal 704B to the first device first device 701 coupled to the user. The audio signal may be a video signal, an audio signal, an optical signal, and the like.

The first device 701 and/or second device 702 may also be configured to determine orientation changes/updates in response to subtle changes of the first device and/or second device 702. For example, in addition to detecting a position/location/orientation change when the user moves in an environment (as shown in FIGS. 7A and 7B), the first device 701 coupled to the user and the second device 702 may determine an orientation update when the first device 701 coupled to the user (e.g., the first device 701 worn by the user) detects that the user has moved their head. In this example, the audio signal rendered to the user moving their head will experience shifting audio with respect to the location/orientation of the second device. In some embodiments, a user may control (via movement, a controller and/or a user interface) to select or focus on audio coming/ arising from (or associated with) a certain direction/object/ person/region. Hence, the audio signal may accordingly be modified/adapted/adjusted as discussed herein, in response to the control, for example to emphasize the relevant portion(s) of the audio signal, and/or to de-emphasize the non-relevant portion(s) of the audio signal, for rendering to the user.

Each user wearing a device (or otherwise coupled to a device) in the environment may experience different spatial audio depending on where the user is in the environment (e.g., the orientation of the first device to the second device 702), and/or which aspects the user wishes to focus on.

In a particular example, the second device 702 may be a sub-woofer with one or more UWB devices. The user coupled to the first device 701 may be a user holding a mobile device including a display. The sub-woofer device may increase the low frequency band output that may otherwise be limited by mobile devices. As the orientation of the first device changes with respect to the second device, the audio signal rendered to the user may be modified. Moreover, the user may use the mobile device and the display to control the audio signals.

In another particular example, the user coupled to the first device 701 may be walking. In the event the first device 701 (or the second device 702) detects that the user coupled to the first device 701 is within a threshold distance from the second device 702, the first device 701 and second device 702 may establish a connection. As described herein, the first device 701 and/or second device 702 may determine that the user coupled to the first device 701 is within a threshold distance from the second device 702 based on UWB signal calculations (e.g., range measurements, TOF measurements). In response to the determined position and/or orientation of the user coupled to the first device 701 with respect to the second device 702, the second device may transmit a signal to the first device. The signal may be an audio signal and/or a video signal. Additionally or alternatively, in response to the first device 701 being within a threshold proximity to the second device 702 (as determined using UWB measurements using UWB devices on the first device 701 and UWB devices on the second device 702), the first device 701 may be triggered to initialize a sensor (such as a camera) and can scan machine readable features (e.g., a barcode, a QR code, etc.) on (or around) the second device 702.

For example, in response to detecting that the user coupled to the first device 701 is near a shop with a second device 702, the first device 701 may receive an image of a digital menu from the second device 702. That is, the digital menu from the second device 702 may be displayed on a screen of the first device 701. Additionally or alternatively, the first device 701 may overlay the image of the digital menu on an environment viewed by the user (e.g., augmented reality) and/or provide an audio description of the menu, the shop and/or items from the shop. In some embodiments, the user coupled to the first device 701 may order one or more items from the digital menu. The first device 701 may verify/authenticate/authorize the user (as described herein) by prompting the user for an authorization credential. In response to receiving the authorization credential, the first device 701 may initiate a financial transaction with the second device 702. Accordingly, the user can pay for the ordered item.

In another example, a user coupled to the first device 701 walking through an amusement park may receive information (e.g., in audio and/or visual form) from devices around the amusement part. For instance, ride information (e.g., wait time, height restrictions, weight restrictions, etc.) may be received by the first device 701 from second device(s) 702 in the amusement park. The first device 701 is configured to communicate the received ride information to the user (e.g., display the ride information on a display, overlay the ride information on the user's view of the environment, audibly communicate the ride information to the user, etc.).

In yet another particular example, a user coupled to the first device 701 may hunt/search for particular devices in an environment. In some embodiments, each of the devices may be unique and contain unique audio signals and/or video signals that are rendered to the user in response to the user being within a predetermined proximity away from the devices and/or in response to the user interacting (physically or digitally) with the devices.

For example, in response to being a predetermined proximity away from a device (e.g., the second device 702), the first device 701 may receive data from the second device 702 that is configured to render particular objects. The first device and/or second device may determine that the user coupled to the first device 701 is within the predetermined proximity by calculating a range using UWB measurements determined by UWB devices on the first device 701 and UWB devices on the second device 702. The user coupled to the first device 701 may directly interact with the rendered object. The first device 701 may capture user gestures, sounds, facial expressions, and the like, and can transmit such data to the second device 702. The gestures, sounds, facial expressions and the like received by the second device 702 may trigger additional audio data and/or video data to be received by the first device 701. In some embodiments, the rendered object may be stored in memory of the first device 701. In some embodiments, the user coupled to the first device 701 indirectly interacts with the rendered object. For example, the user coupled to the first device 701 may walk toward the rendered object. As discussed herein, walking toward the rendered object can change the orientation and/or position of the first device 701 relative to the second device 702. Accordingly, the first device 701 may receive audio data and/or video data from the second device 702 responsive to the changes in orientation and/or position. For example, as the user walks toward the rendered object, the user may experience audio that increases in volume and/or video content that increases in detail/clarity/fidelty. In addition to volume changes, the audio content may change. For instance, more detailed information may be communicated to the user via the first device 701.

In yet another example, the first device 701 may locate one or more other devices in an environment based on range, TOF, and/or AoA received from the UWB devices of the one or more other devices in the environment. For instance, the user coupled to the first device 701 may receive information related to an identity, location and/or orientation of the second device 702 with respect to the first device 701 using UWB measurements. As the user walks closer to the second device 702, the location/orientation of the first device 701 with respect to the second device 702 changes. Accordingly, the first device 701 may communicate instructions to the user that indicate how the user can get closer to the second device 702. Additionally or alternatively, the first device 702 may communicate instructions to the user that indicate how far away the second device 702 is from the user. In some embodiments, the second device 702 may be what the user has lost/misplaced or is locating. For instance, the second device may be a car and/or mobile phone. Additionally or alternatively, the second device 702 may be coupled to something that the user has lost/misplaced. For instance, the second device 702 may be coupled to a child, a wallet, house keys, etc.

In yet another particular example, multiple runners of a marathon may each be coupled with a device. One or more other devices (beacons) may be arranged in the city such that the runners receive directions from each of the beacons in the city via the devices coupled to the runners. For example, the beacons may be used to build a map to help navigate the runner. The device coupled to each user may display (or overlay) the map to the user using a screen, and/or display the map in an environment visible to the user (e.g., as augmented reality). Each runner may receive location information (e.g., a mile number), a position number (e.g., a rank of the runner in the marathon), timing information, directions to the next beacon, and the like, via customized audio signals from a proximately-located beacon for instance. Accordingly, the information communicated to each of the runners in the marathon can be unique and relevant with respect to that particular runner because each runner is coupled to a unique device. Therefore, each of the beacons may transmit relevant information (e.g., location information, position number, timing information, directions, and the like) to each runner using the devices coupled to each runner, even if multiple runners arrive at the beacon at the same time. Moreover, each of the beacons in the city may be considered gates, where a runner is determined to have successfully completed the marathon (and/or specific stages of the marathon) in response to being within a predetermined distance from each of the corresponding gate(s). In this manner, the runners in the marathon cannot cheat because the runners is supposed to pass each gate.

Figure 8:
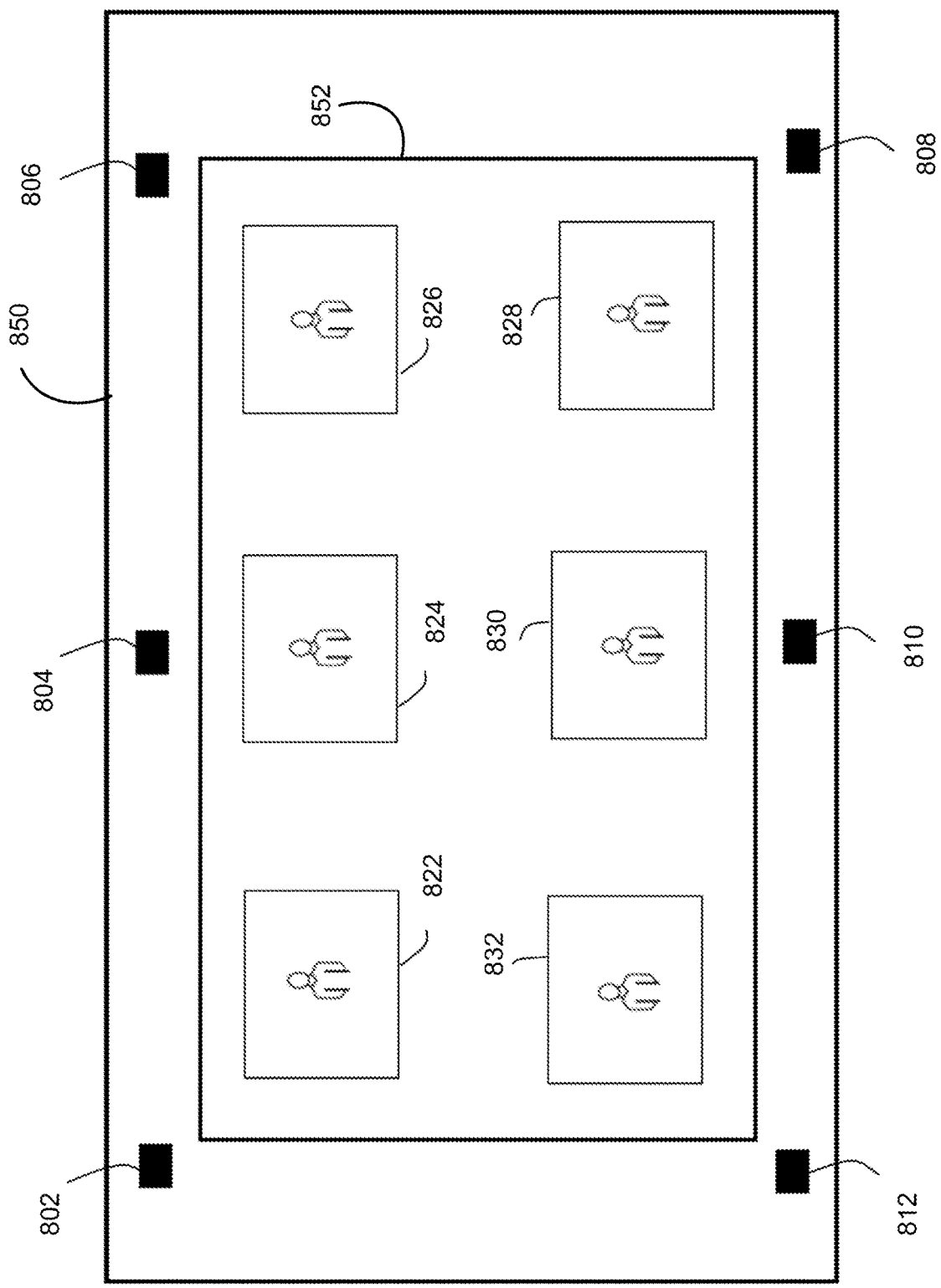
FIG. 8, is an example of spatial audio calling, according to an example implementation of the present disclosure.

Referring to FIG. 8, depicted is an illustrative example of spatial audio based calling (or videoconference), according to an example implementation of the present disclosure. A device 850 includes a screen 852. The device 850 may be any smart screen device, TV, tablet, phone, or the like, with multiple UWB antennas 802-812. A user using the device 850 may view (or otherwise interact) with device 850 using the screen 852. The user may be coupled to a HWD (not shown) with one or more UWB antennas. The user may be viewing one or more objects on screen 852. As shown, the user may be in a conference call with users 822-832 in different virtualized and/or spatialized locations on the screen 852.

In one example implementation, the device 850 anchors the HWD (not shown). The HWD and/or device 850 may determine the orientation of the HWD relative to the device 850 using the UWB antennas 802-812 of the device 850 and the one or more UWB antennas of the HWD (not shown). Determining the orientation of the HWD relative to the device 850 may provide information to the HWD and/or device 850 as to what user 822-832 the user is paying attention to (e.g., listening to, watching, etc.). The HWD and/or device 850 may detect that the user has moved their head based on a detected change in orientation of the HWD relative to the device 850. As discussed herein, the orientation of the HWD relative to the device 850 may be determined using TOF calculations, range analyses, and/or AoA analyses of the UWB antennas 802-812 and the UWB antennas of the HWD (not shown). For example, the HWD and/or device 850 may determine that the user has moved their head and is looking at user 822. The HWD and/or device 850 may determine that the user wearing the HWD is looking at user 822 in response to the range between UWB antenna 802 and a UWB antenna on the HWD being the shortest (e.g., the HWD is tilted in the direction of UWB antenna 802, indicating that the user wearing the HWD is looking at the user 822). Similarly, the HWD and/or device 850 may determine that the user has moved their head and is looking at user 828 based on UWB measurements (e.g., on orientation or AoA) between the HWD and the device 850. For instance, the TOF calculation between the UWB antenna 808 and a UWB antenna on the HWD may be the shortest, indicating that the user has tilted their head to look at user 828.

In some embodiments, the HWD and/or device 850 may determine a user from the users 822-832, that the user wearing the HWD is looking at (e.g., identifying a user of interest) using one or more sensors and/or user inputs. For example, in some embodiments, the user coupled to the HWD may select a user of interest using gestures (head gestures and/or hand gestures captured by a camera of the HWD and/or device 850) and/or user input.

In response to identifying a user of interest from the users 822-832, the other users (e.g., remaining users, the users that the user wearing the HWD is not looking at) may appear dimmed on display 852, may be muted, and the like. In this manner, the user wearing the HWD can focus on the user of interest. For example, the HWD can change the audio received from the remaining users using an equalizer, the HWD can filter out background audio, the HWD can boost the audio associated with the audio received from the user of interest (using one or more speech recognition operations to lock onto (or filter) the data associated with the user of interest), and the like. This user focus determined from UWB measurements may be beneficial in scenarios such as crowded conference rooms and/or virtual hang-out places.

In some embodiments, the HWD and/or second device may determine that the user wearing the HWD is looking away from the display 852 based on the UWB measurements of the HWD relative to the device 850 (e.g., the orientation of the HWD relative to device 850). Accordingly, the HWD/device 850 may be configured to dim the display 852 of device 850, mute all audio (captured by a microphone on the HWD and/or projected from a speakerphone of device 850) and/or turn off a camera recording (captured images/frames) of the user wearing the HWD.

Figure 9:
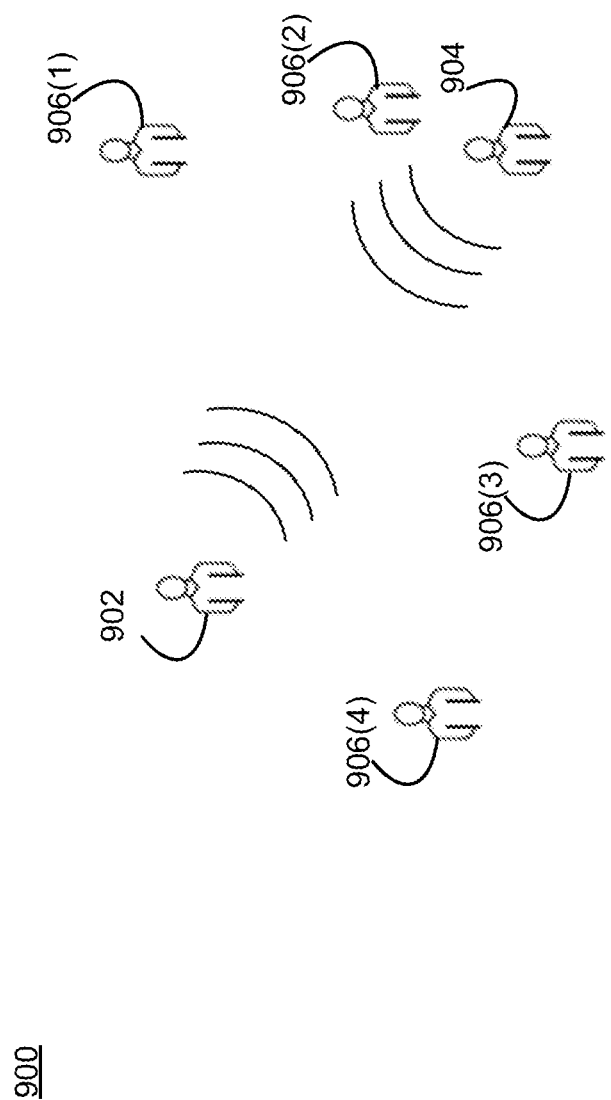
FIG. 9, is an example of focused conversation/hearing based on location based microphone beamforming, according to an example implementation of the present disclosure.

Referring to FIG. 9, depicted is an illustrative example of focused conversation/hearing based on location-based microphone beamforming, according to an example implementation of the present disclosure. Each user 902, 904, 906(1)-906(4) in scene 900 may be coupled to a device having one or more UWB devices (e.g., UWB antennas), a microphone, a speaker phone, a display, and/or other processors configured to perform various functions. Each of the users in scene 900 may be displayed information conveying the presence of each of the other users in the scene 900. For example, the devices coupled to each user may display each of the other users in the scene 900. In some embodiments, the display of each users is on a screen. In other embodiments, the display of each user is overlaid in an environment visible to the user (e.g., augmented reality). Moreover, each of the users may be configured to speak (e.g., generate audio such that each user may be considered a unique/independent audio source). In scene 900, user 902 may attempt to communicate with user 904. Accordingly, user 902 and user 904 are users of interest (e.g., to each other), and users 906(1)-906(4) are remaining users. In some embodiments, the remaining users 906(1)-906(4) may (be configured to) hear and/or see the communication between user 902 and user 904. In other embodiments, the remaining users 906(1)-906(4) are not able to hear/see the communication between user 902 and 904.

In some embodiments, either user 902 and/or user 904 may indicate that the user 902/904 wishes to enter into a communication channel with the other user 904/902. In some embodiments, both users 902 and 904 must agree to enter into the communication channel. The users 902/904 may indicate that they wish to enter into a communication channel by selecting the other user 904/902. For example, the user 902/904 may select user 904/902 audibly (e.g., saying a user identifier associated with user 904/902), using an input (e.g., a mouse input, a text input, etc.), using a gesture (head gesture, hand gesture, etc.) and the like.

In the example, in response to user 902 selecting to initiate a communication channel with user 904 (and in some embodiments, user 904 accepting the communication request received from user 902), the position and distance of user 904 from user 902 may be determined by the device coupled to user 902. For instance, UWB antennas on the device coupled to user 902 may exchange signals such that the device coupled to user 902 may determine UWB information such as TOF, AoA, and/or range information, as described herein. In some embodiments, multiple devices in the scene 900 may exchange signals using UWB antennas and can determine UWB information such as TOF, AoA, and/or range information. In other embodiments, a different device (not shown) may determine TOF, AoA, and/or range information of one or more devices in scene 900.

As user 902 and/or 904 move around the scene 900, the devices coupled to each user may exchange and/or update the UWB information. Accordingly, the device coupled to user 902 updates the position/orientation of the user 904 (the user 904 being coupled to a device with UWB antennas) and the device coupled to user 904 updates the position/orientation of the user 902 (the user 902 being coupled to a device with UWB antennas). Therefore, each device coupled to user 902/904 may (indirectly) determine/calculate a position/orientation relative to the other device without (directly) receiving/detecting/knowing the absolute position of the user 902/user 904.

The devices may also update position/orientation of microphone elements to facilitate beamforming that locks on to the user of interest. In the example, the user of interest for user 902 is user 904, and the user of interest for user 904 is user 902. Accordingly, the device coupled to user 902 may lock onto the device coupled to user 904. A microphone (and/or an array of microphone elements, an array of microphones) on the device associated with user 902 and/or user 904 respectively may be controlled. One or more microphone elements may receive instructions to steer the microphone elements towards user 904/902 respectively. In this manner, the device associated with the user 902/904 enhances the audio of the user 904/902 using beamforming. The updated position/orientation of each of the microphone elements of the device coupled to user 902 and/or device coupled to user 904 can change the beamforming to keep the focus on the microphone on the user of interest. For example, even if the device coupled to user 902 receives audio from users 906(1)-906(4) and user 904 via a microphone of the device coupled to user 902, the device coupled to user 902 can select the audio (and corresponding audio signal/audio streams) associated with user 904 based on the determined orientation/location of the device coupled to user 902 and the device coupled to user 904.

In some embodiments, the device coupled to user 902 and/or the device coupled to user 904 may use the UWB information to modify received audio signals to spatialize the sound such that the sound received from the user of interest appears to change with the position/orientation of the user. For instance, as user 904 walks away from user 902, the audio of user 904 may seem quieter/softer to user 902. Accordingly, the device coupled to the user 902 renders the audio of user 904 according to the determined orientation with respect to the other devices in the scene 900. In particular, the device coupled to the user 902 renders the audio originating from user 904 by selecting (and in some cases modifying) the received audio streams from user 904.

In some embodiments, each of the devices may employ one or more additional sensors (e.g., cameras) to further provide position information, orientation information, and the like. For example, one or more cameras executed by one or more devices (e.g., device coupled to user 902 and/or device coupled to user 904) may employ object detection/recognition operations and/or object tracking operations to track users of interest (e.g., user 902 and/or user 904). Information associated with tracking the user of interest (such as position information, orientation information, etc.) may be used by devices coupled to user 902 and/or devices coupled to user 904 to supplement/improve/confirm the determined position/orientation using UWB signals.

Figure 10:
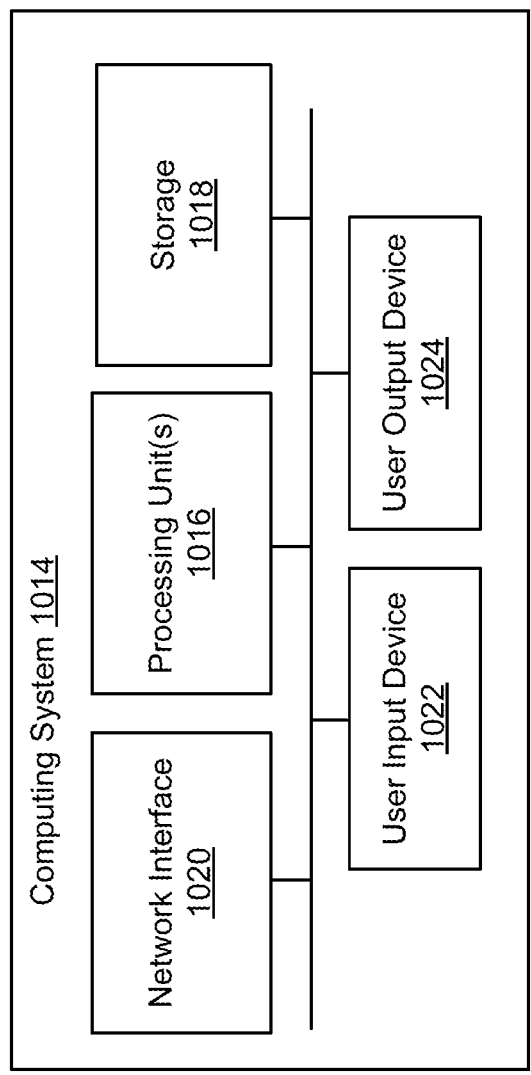
FIG. 10 is a block diagram of a computing environment, according to an example implementation of the present disclosure.

In some embodiments, one or more processors of the device coupled to user 902 and/or device coupled to user 904 may employ voice recognition software to track (and enhance) audio data associated with the user of interest (e.g., user 902 and/or user 904). For example, the device coupled to user 902 may contain voice recognition software that is trained to identify the voice of user 904. The device coupled to user 902 may receive multiple audio streams originating from users in the scene 900 (e.g., users 906(1)-906(4) and user 904). Accordingly, the one or more processors may recalibrate the received audio signals using the voice recognition software to filter out the audio signals associated with users 906(1)-906(4), keeping the focus of the audio on user 904. Therefore, even though the device coupled to user 902 may receive multiple audio signals (or portions of audio signals) from users 906(1)-906(4), in addition to user 904, the device coupled to user 902 can render the audio associated with user 904. Various operations described herein can be implemented on computer systems. FIG. 10 shows a block diagram of a representative computing system 1014 usable to implement the present disclosure. In some embodiments, the computing device 110, the HWD 150, devices 302, 304, or each of the components of FIG. 1-9 are implemented by or may otherwise include one or more components of the computing system 1014. Computing system 1014 can be implemented, for example, as a consumer device such as a smartphone, other mobile phone, tablet computer, wearable computing device (e.g., smart watch, eyeglasses, head wearable display), desktop computer, laptop computer, or implemented with distributed computing devices. The computing system 1014 can be implemented to provide VR, AR, MR experience. In some embodiments, the computing system 1014 can include conventional computer components such as processors 1016, storage device 1018, network interface 1020, user input device 1022, and user output device 1024.

Network interface 1020 can provide a connection to a wide area network (e.g., the Internet) to which WAN interface of a remote server system is also connected. Network interface 1020 can include a wired interface (e.g., Ethernet) and/or a wireless interface implementing various RF data communication standards such as Wi-Fi, Bluetooth, UWB, or cellular data network standards (e.g., 3G, 4G, 5G, 60 GHz, LTE, etc.).

User input device 1022 can include any device (or devices) via which a user can provide signals to computing system 1014; computing system 1014 can interpret the signals as indicative of particular user requests or information. User input device 1022 can include any or all of a keyboard, touch pad, touch screen, mouse or other pointing device, scroll wheel, click wheel, dial, button, switch, keypad, microphone, sensors (e.g., a motion sensor, an eye tracking sensor, etc.), and so on.

User output device 1024 can include any device via which computing system 1014 can provide information to a user. For example, user output device 1024 can include a display to display images generated by or delivered to computing system 1014. The display can incorporate various image generation technologies, e.g., a liquid crystal display (LCD), light-emitting diode (LED) including organic light-emitting diodes (OLED), projection system, cathode ray tube (CRT), or the like, together with supporting electronics (e.g., digital-to-analog or analog-to-digital converters, signal processors, or the like). A device such as a touchscreen that function as both input and output device can be used. Output devices 1024 can be provided in addition to or instead of a display. Examples include indicator lights, speakers, tactile "display" devices, printers, and so on.

Some implementations include electronic components, such as microprocessors, storage and memory that store computer program instructions in a computer readable storage medium (e.g., non-transitory computer readable medium). Many of the features described in this specification can be implemented as processes that are specified as a set of program instructions encoded on a computer readable storage medium. When these program instructions are executed by one or more processors, they cause the processors to perform various operation indicated in the program instructions. Examples of program instructions or computer code include machine code, such as is produced by a compiler, and files including higher-level code that are executed by a computer, an electronic component, or a microprocessor using an interpreter. Through suitable programming, processor 616 can provide various functionality for computing system 614, including any of the functionality described herein as being performed by a server or client, or other functionality associated with message management services.

It will be appreciated that computing system 1014 is illustrative and that variations and modifications are possible. Computer systems used in connection with the present disclosure can have other capabilities not specifically described here. Further, while computing system 1014 is described with reference to particular blocks, it is to be understood that these blocks are defined for convenience of description and are not intended to imply a particular physical arrangement of component parts. For instance, different blocks can be located in the same facility, in the same server rack, or on the same motherboard. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Implementations of the present disclosure can be realized in a variety of apparatus including electronic devices implemented using any combination of circuitry and software.

Having now described some illustrative implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements and features discussed in connection with one implementation are not intended to be excluded from a similar role in other implementations or implementations.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit and/or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein can also embrace implementations including only a single element. References in the singular or plural form are not intended to limit the presently disclosed systems or methods, their components, acts, or elements to single or plural configurations. References to any act or element being based on any information, act or element can include implementations where the act or element is based at least in part on any information, act, or element.

Any implementation disclosed herein can be combined with any other implementation or embodiment, and references to "an implementation," "some implementations," "one implementation" or the like are not necessarily mutually exclusive and are intended to indicate that a particular feature, structure, or characteristic described in connection with the implementation can be included in at least one implementation or embodiment. Such terms as used herein are not necessarily all referring to the same implementation. Any implementation can be combined with any other implementation, inclusively or exclusively, in any manner consistent with the aspects and implementations disclosed herein.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Systems and methods described herein may be embodied in other specific forms without departing from the characteristics thereof. References to "approximately," "about" "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

The term "coupled" and variations thereof includes the joining of two members directly or indirectly to one another. Such joining may be stationary (e.g., permanent or fixed) or moveable (e.g., removable or releasable). Such joining may be achieved with the two members coupled directly with or to each other, with the two members coupled with each other using a separate intervening member and any additional intermediate members coupled with one another, or with the two members coupled with each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References to "or" can be construed as inclusive so that any terms described using "or" can indicate any of a single, more than one, and all of the described terms. A reference to "at least one of 'A' and 'B'" can include only 'A', only 'B', as well as both 'A' and 'B'. Such references used in conjunction with "comprising" or other open terminology can include additional items.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

References herein to the positions of elements (e.g., "top," "bottom," "above," "below") are merely used to describe the orientation of various elements in the FIGURES. The orientation of various elements may differ according to other exemplary embodiments, and that such variations are intended to be encompassed by the present disclosure.

The invention claimed is:

1. A method comprising: establishing, by a first device comprising a first ultra-wideband (UWB) antenna, a connection with a second device having a second UWB antenna; determining, by the first device, an orientation of the first device relative to the second device, according to one or more UWB measurements between the first UWB antenna of the first device and the second UWB antenna of the second device; receiving, by the first device, audio signals corresponding to the second device; and rendering, by the first device, the audio signals into audio output to a user of the first device, the audio signals rendered according to the determined orientation.

2. The method of claim 1, wherein the audio signals are received by the first device from the second device, and wherein the audio signals are generated by a microphone of the second device.

3. The method of claim 1, wherein the audio signals are received by the first device from an audio source separate from the second device, and wherein the audio signals correspond to an object located in proximity to the second device.

4. The method of claim 1, wherein first device or the second device comprises a plurality of UWB antennas, and wherein determining the orientation comprises determining an angle of arrival (AoA) of the first device relative to the second device.

5. The method of claim 1, further comprising:
displaying, by the first device, a user interface including representations of a plurality of second users, each of the plurality of second users corresponding to a respective audio source; wherein rendering the audio comprises:

rendering, by the first device, the audio signals as audio output to the user of the first device according to the determined orientation, the audio signals comprising audio data from at least some of the respective audio sources.

6. The method of claim 5, wherein rendering the audio signals comprises rendering, by the first device, the audio signals to the user of the first device according to the determined orientation with respect to representations of the plurality of second users on the user interface.

7. The method of claim 6, further comprising selecting, by the first device, one of the respective audio sources for incorporating audio data into the audio signals rendered by the first device, according to the determined orientation.

8. The method of claim 1, further comprising:

receiving, by the first device, a plurality of audio data streams from a plurality of microphones of the first device; and selecting, by the first device, a first audio data stream of the plurality of audio data streams, according to the determined orientation of the first device relative to the second device, wherein the audio signals are from the first audio data stream.

9. The method of claim 8, further comprising:

determining, by the first device, a change in the orientation of the first device relative to the second device, according to one or more second UWB measurements between the first UWB antenna of the first device and the second UWB antenna of the second device; and selecting, by the first device, a second audio stream of the plurality of audio data streams, according to the determined change in the orientation of the first device relative to the second device.

10. The method of claim 8, further comprising:

receiving, by the first device, a request to pair with the second device;

initiating, by the first device, pairing between the first device and the second device; and receiving, by the first device, the plurality of audio data streams from the plurality of microphones of the first device responsive to successful pairing between the first device and the second device.

11. A first device comprising: a first ultra-wideband (UWB) antenna; and one or more processors configured to: establish a connection with a second device having a second UWB antenna; determine an orientation of the first device relative to the second device, according to one or more UWB measurements between the first UWB antenna of the first device and the second UWB antenna of the second device; receive audio signals corresponding to the second device; and render the audio signals into audio output to a user of the first device, the audio signals being rendered according to the determined orientation.

12. The first device of claim 11, wherein the audio signals are received by the first device from the second device, and wherein the audio signals are generated by a microphone of the second device.

13. The first device of claim 11, wherein the audio signals are received by the first device from an audio source separate from the second device, and wherein the audio signals correspond to an object located in proximity to the second device.

14. The first device of claim 11, wherein first device or the second device comprises a plurality of UWB antennas, and wherein determining the orientation comprises determining an angle of arrival (AoA) of the first device relative to the second device.

15. The first device of claim 11, wherein the one or more processors are further configured to: display a user interface including representations of a plurality of second users, each of the plurality of second users corresponding to a respective audio source; wherein the audio signals are rendered as audio output to the user of the first device according to the determined orientation, the audio signals comprising audio data from at least some of the respective audio sources.

16. The first device of claim 15, wherein the one or more processors are configured to render the audio signals to the user of the first device according to the determined orientation with respect to representations of the plurality of second users on the user interface.

17. The first device of claim 16, wherein the one or more processors are configured to select one of the respective audio sources for incorporating audio data into the audio signals rendered by the first device, according to the determined orientation.

18. The first device of claim 11, wherein the one or more processors are configured to: receive a plurality of audio data streams from a plurality of microphones of the first device; and select a first audio data stream of the plurality of audio data streams, according to the determined orientation of the first device relative to the second device, wherein the audio signals are from the first audio data stream.

19. The first device of claim 18, wherein the one or more processors are configured to: receive a request to pair with the second device;

initiate pairing between the first device and the second device; and receive the plurality of audio data streams from the plurality of microphones of the first device responsive to successful pairing between the first device and the second device.

20. A non-transitory computer readable medium storing instructions that, when executed by one or more processors, cause the one or more processors to:

establish a connection between a first device comprising a first ultra-wideband (UWB) antenna and a second device having a second UWB antenna; determine an orientation of the first device relative to the second device, according to one or more UWB measurements between the first UWB antenna of the first device and the second UWB antenna of the second device;

receive audio signals corresponding to the second device; and render the audio signals into audio output to a user of the first device, the audio signals being rendered according to the determined orientation.

* * * * *